United States Patent [19]

Meinhardt et al.

[11] 3,868,330

[45] Feb. 25, 1975

[54] LUBRICANTS AND FUEL CONTAINING HIGH MOLECULAR WEIGHT CARBOXYLIC ACID ACYLATING AGENTS AND THEIR DERIVATIVES

[75] Inventors: Norman A. Meinhardt, Lyndhurst, Ohio; Charles Wesley Adams, Greenville, S.C.

[73] Assignee: The Lubrizol Corporation, Wickliffe, Ohio

[22] Filed: May 16, 1973

[21] Appl. No.: 360,991

Related U.S. Application Data

[63] Continuation-in-part of Ser. No. 80,500, Oct. 13, 1970, Pat. No. 3,755,169.

[52] U.S. Cl..................... 252/33.6, 252/35, 252/39, 252/41, 252/51.5 A, 252/54.6, 252/56 D, 252/56 R
[51] Int. Cl. ..................... C10m 1/24, C10m 1/30, C10l/1/20
[58] Field of Search ... 252/33.6, 35, 39, 41, 51.5 A, 252/56 D, 56 R, 54.6; 44/63, 66, 68, 70, 71

[56] References Cited
UNITED STATES PATENTS
3,215,707  11/1965  Rense .................................. 44/71 X
3,231,587  1/1966   Rense .................................. 252/56 D
3,639,242  2/1972   LeSuer................................. 252/56 R Primary Examiner—Daniel E. Wyman
Assistant Examiner—W. J. Shine
Attorney, Agent, or Firm—J. Walter Adams, Jr.; Daniel N. Hall

[57] ABSTRACT

Process for preparing high molecular weight polycarboxylic acid acylating agents by contacting chlorine with a reaction mixture comprising (1) high molecular weight monocarboxylic acid and ethylenically unsaturated low molecular weight mono- or polycarboxylic acid acylating agent or (2) high molecular weight aliphatic hydrocarbon, ethylenically unsaturated low molecular weight mono-carboxylic acid acylating agent, and ethylenically unsaturated low molecular weight polycarboxylic acid acylating agent. Acylating agents thus produced have utility, for example, as intermediates in the preparation of acylated nitrogen compounds, esters, metal salts, and the like which are useful as additives in lubricants and fuels.

20 Claims, No Drawings

LUBRICANTS AND FUEL CONTAINING HIGH MOLECULAR WEIGHT CARBOXYLIC ACID ACYLATING AGENTS AND THEIR DERIVATIVES

This is a continuation-in-part application of earlier-filed copending application Ser. No. 80,500 filed Oct. 13, 1970, now U.S. Pat. No. 3,755,169.

This invention relates to high molecular weight carboxylic acid acylating agents, novel processes for their preparation, esters derived from these acylating agents, and lubricants and fuels containing the esters. In particular, the invention is concerned with the process for preparing high molecular weight carboxylic acid acylating agents by chlorinating certain reaction mixtures, the high molecular weight carboxylic acid acylating agent-containing reaction products of the process, derivatives produced from these acylating agents, and lubricants and fuels containing these derivatives. Further aspects of this invention will become apparent from the following detailed descriptions thereof.

As is now well-known in the art, high molecular weight carboxylic acid acylating agents have been found to be useful as additives in lubricants and fuels and as intermediates in the preparation of additives for lubricants and fuels. See, for example, U.S. Pat. Nos. 3,219,666; 3,254,025; 3,271,310; 3,272,743; 3,272,746; 3,278,550; 3,373,111; 3,374,174; 3,381,022; 3,288,714; 3,346,354; 3,307,928; 3,394,179. Generally, the high molecular weight carboxylic acid acylating agents of the prior art have been prepared by reacting a polyolefin or chlorinated polyolefin with maleic anhydride or acrylic acid. U.S. Pat. No. 3,340,281 also discloses a method for preparing high molecular weight carboxylic acid acylating agents by reacting a polyolefin with haloacetyl chloride. U.S. Pat. Nos. 3,215,707 and 3,231,587 disclose a process for preparing hydrocarbon-substituted succinic anhydrides by reacting a polyolefin with maleic anhydride in the presence of chlorine. As exemplified in the foregoing patents, the high molecular weight carboxylic acid acylating agents are generally reacted with alcohols, hydroxyaromatic compounds, and amines to produce reaction products which are useful principally as detergent-dispersants in lubricants and fuels.

According to the present invention, novel high molecular weight carboxylic acid acylating agents are produced by one of three processes. In addition, these acylating agents can be reacted with various alcohols, hydroxyaromatic compounds, amines, basically reacting metal compounds, or mixtures of two or more of these to produce esters, metal salts, and other derivatives of the high molecular weight carboxylic acid acylating agents which are useful as detergent-dispersant additives in lubricants and fuels.

Accordingly, it is the principal object of the present invention to provide novel processes for preparing high molecular weight carboxylic acid acylating agents. Another principal object is to provide novel high molecular weight carboxylic acid acylating agents. A further object is to provide derivatives such as acylated amines, esters, metal salts, mixed ester-metal salts, and the like, of the high molecular weight carboxylic acid acylating agents. A further object is to provide lubricants and fuels containing the high molecular weight carboxylic acid acylating agents and their derivatives. Other objects of the invention will become apparent from the detail description presented hereinafter.

These and other objects of this invention are achieved by providing a process for preparing oil-soluble high molecular weight carboxylic acid acylating agents comprising intimately contacting chlorine with a reaction mixture at a temperature of at least 140°C., wherein the reaction mixture is selected from the group consisting of: (I) a first reactant which is at least one (A) monocarboxylic acid acylating agent containing an average of at least about fifty aliphatic carbon atoms in the acyl moiety exclusive of the carboxyl function and at least one (B) low molecular weight carboxylic acid reactant which is an ethylenically unsaturated mono- or polycarboxylic acid acylating agent containing up to about twenty carbon atoms in the acyl moiety, the mole ratio of (A) to (B) being such that there is at least 0.5 mole of (B) for each mole of (A) with the proviso that (B) provides a minimum of one equivalent of carboxylic acid reactant in the reaction mixture per mole of (A); or (II) at least one (C) ethylenically unsaturated aliphatic hydrocarbon or substituted aliphatic hydrocarbon reactant containing an average of at least about 50 aliphatic carbon atoms, at least one (D) low molecular weight monocarboxylic acid reactant which is an ethylenically unsaturated monocarboxylic acid acylating agent containing a total of up to about twenty carbon atoms in the acyl moiety, and at least one (E) low molecular weight polycarboxylic acid reactant which is an ethylenically unsaturated polycarboxylic acid acylating agent containing up to about 20 carbon atoms in the acyl moiety, the mole ratio of (C):(D):(E) being such that there is at least about 0.5 mole of each (D) and (E) per mole of (C) with the proviso that the combined amount of (D) and (E) provides a minimum of at least two equivalents of low molecular weight mono- and polycarboxylic acid reactants per mole of (C), the total amount of chlorine employed in the processes being sufficient to provide at least about one mole of chlorine per mole of (B) or at least one mole of chlorine per the total number of moles of (D) and (E), respectively.

The novel high molecular weight carboxylic acid acylating agents of this invention are the reaction products of the foregoing processes and the lubricant and fuel compositions of this invention are those containing these acylating agents or their derivatives, for example, the metal salts, esters, amides, or mixtures of these. The lubricant and fuel compositions of this invention comprise respectively a major amount of lubricating oil or a normally liquid fuel and 0.0001% to 20% by weight of at least one oil-soluble high molecular weight carboxylic acid acylating agent prepared by the process herein disclosed.

Prior to discussing the intermediates, to be used in the processes of this invention, it is pointed out that the terminology as "carboxylic acid acylating agents" and similar terminology as used in the specification and claims is intended to designate not only the carboxylic acids per se but also those corresponding functional derivatives of the carboxylic acids capable of reacting with amines, alcohols, hydroxyaromatic compounds or basically reacting metal compounds, to produce amine salts, amides, imides, amidines, esters, or metal salts. Generally, then the carboxylic acid acylating agents will be the carboxylic acids per se, their anhydrides, their acyl halides, and their esters with lower aliphatic alcohols, that is, monohydric alcohols containing up to about seven carbon atoms, especially lower alkanols, and mixtures of two or more of these acylating agents. Preferably however, the carboxylic acid acylating agent will be the acids per se, their anhydrides, their acyl chlorides, and the lower alkyl esters derived from alkanols of up to four carbon atoms. Of course, even the carboxylic acid derivatives such as the amides can be regarded as acylating agents since they can be employed in transamidation reactions. As a practical matter, the carboxylic acid acylating agents will ordinarily be the carboxylic acids per se and the carboxylic acid anhydrides including mixtures of two or more of such acylating agents.

The "acyl moiety exclusive of the carboxyl functions" is the residual radical of a carboxylic acid acylating agent assuming removal of the carboxyl groups. By way of example T represents the "acyl moiety exclusive of the carboxyl functions" of carboxylic acid acylating agents of the formula

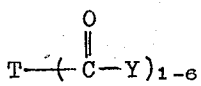   Formula I where Y is, for example, halo, OH, lower alkoxy, or together forms an acid anhydride group with another Y radical. The group represented by

is the "carboxyl function."

Monocarboxylic acid acylating agents containing an average of at least about fifty aliphatic carbon atoms, that is, (A), suitable for use in the foregoing processes are known in the art. For example, U.S. Pat. No. 3,340,281 discloses the preparation of monocarboxylic acid acyl halides by reacting a polymerized monoolefin with haloacetyl halide under free radical conditions at a temperature of about 50°C. to about 225°C. A typical free radical initiator employed in this process is di-(tert-butyl) peroxide. Suitable polyolefins include polybutenes, polypropylenes, polyethylenes, and other polymers of monoolefins, especially polymers of 1-monoolefins, having an average of at least about 50 aliphatic carbon atoms per poly(monolefin) molecule. Likewise, interpolymers of two or more of these monoolefins are also suitable such as ethylenepropylene copolymers, ethylene-propylene-1-hexene terpolymers, and the like.

Other high molecular weight monocarboxylic acid acylating agents and processes for their preparation are disclosed in U.S. Pat. Nos. 3,390,086 and 3,451,931. According to a procedure disclosed in these patents, a chlorinated aliphatic hydrocarbon is reacted with a low molecular weight carboxylic acid reactant which is an ethylenically unsaturated monocarboxylic acid acylating agent. For example a high molecular weight monocarboxylic acid is prepared by chlorinating 2,000 parts of polyisobutylene having an average molecular weight of about 950 dissolved in 100 parts of carbon tetrachloride at a temperature of about 25°C. until the chlorine content of the polyisobutene is about 4.33% by weight. After removing the carbon tetrachloride solvent, 600 parts of the chlorinated polyisobutylene thus produced and 55 parts of acrylic acid are heated to about 230°C. over a period of 18 hours. Thereafter the mixture is blown with nitrogen for one-half hour at about 230°C., cooled to about 120°C., and filtered. The low molecular weight ethylenically unsaturated carboxylic acid reactant is generally an aliphatic α,β-ethylenically unsaturated monocarboxylic acid or suitable acylating derivative thereof of up to about twenty carbon atoms and usually not more than ten carbon atoms. Suitable ethylenically unsaturated acids are illustrated by acrylic acid, methacrylic acid, crotonic acid, isocrotonic acid, tiglic acid, angelic acid, sorbic acid, cinnamic acid, α-eleostearic acid, β-eleostearic acid, linoleic acid, α-linolenic acid, elaidic acid, oleic acid, erucic acid, 3-cyclohexene-1-carboxylic acid, 1-cyclohexene-1-carboxylic acid, and those monocarboxylic acids discussed below with respect to (B).

Other procedures for preparing monocarboxylic acids are known in the prior art. For example U.S. Pat. No. 3,451,931 also points out that it is known that high molecular weight monocarboxylic acids can be prepared by oxidizing a monohydric alcohol with potassium permanganate or by reacting a halogenated high molecular weight olefin polymer with a ketene. Similarly, hydrolysis of high molecular weight mononitriles will produce the corresponding acids.

These monocarboxylic acid acylating agents containing an average of at least about 50 aliphatic carbon atoms are conveniently represented by the formula $$R_a\text{—COOH}$$

Formula II where $R_a$ is the acyl residue containing an average of at least about 50 aliphatic carbon atoms. Their average molecular weights will be in the range of about 700 to about 5,000. Ordinarily, the monocarboxylic acid acylating agents will be completely aliphatic, that is, they will contain no aryl substituents. However, such monocarboxylic acids containing aryl substituents are suitable provided there is not more than one pendant aryl substituent per 25 aliphatic carbon atoms in the monocarboxylic acid acylating agent. Preferably, $R_a$ will be an ethylenically unsaturated group. That is, it will have at least one

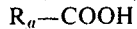

linkage but not more than about one such linkage per twenty-five aliphatic carbon atoms in $R_a$. Furthermore, $R_a$ will generally be a hydrocarbon group although it is contemplated that the $R_a$ group can contain non-hydrocarbon substituents such as nitro, halo, lower alkoxy, lower alkyl, mercapto, oxo (i.e.,=O), thioxo (i.e.,=S) and the like provided these non-hydrocarbon substituents do not account for more than 10% by weight of the total weight of the monocarboxylic acid acylating agent exclusive of the carboxyl function, that is, the total weight of $R_a$.

The low molecular weight carboxylic acid reactant, that is, (B), is an ethylenically unsaturated mono- or polycarboxylic acid acylating agent containing a total of up to about 20 carbon atoms in the acyl moiety and up to six carboxyl functions, usually one to three carboxyl functions. They are well-known in the art and can be represented by the formula

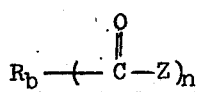   Formula III where $R_b$ is an ethylenically unsaturated hydrocarbon or ethylenically unsaturated substituted hydrocarbon radical having a valence equal to $n$ and $n$ is a whole number of one to six. Usually $R_b$ will be completely aliphatic but it may contain cycloaliphatic and aromatic groups as long as it contains at least one ethylenic linkage,

and the total number of carbon atoms in the acyl moiety, that is, $R_b$, does not exceed about 20. Among the substituents which may be present on $R_b$ are nitro, halo such as chloro, fluoro, bromo, and iodo; lower alkoxy such as methoxy, ethoxy, isopropoxy, and n-heptyloxy; lower alkyl mercapto such as methylthio, ethylthio, n-butylthio, and n-hexylthio; oxo; and thioxo. Usually, not more than four such substituents would be present on $R_b$. The

groups are the carboxyl functions as discussed above. For example, Z can be —OH, -halo such as —Cl, lower alkoxy, and the like or together with another Z of the same or different molecule can form an anhydride group.

The following are illustrative examples of (B): acrylic acid, methacrylic acid, crotonic acid, isocrotonic acid, tiglic acid, angelic acid, 2,4-hexadienoic acid, oleic acid, elaidic acid, linoleic acid, α-eleostearic acid, β-eleostearic acid, α-linolenic acid, erucic acid, maleic acid, fumaric acid, itaconic acid, cinnamic acid, 2-, 3-, or 4-carboxycinnamic acid, 2-methallylsuccinic acid, aconitic acid, ethoxymethylene malonic acid (i.e., $C_2H_5OCH=C(CO_2H)_2$), cinnamalmalonic acid (i.e., $C_6H_5CH=CHCH=C(CO_2H)_2$), allylmalonic acid, (i.e., $CH_2=CHCH_2CH(CO_2H)_2$), chloromaleic acid, bromomaleic acid, 3-cyclohexene-1,2-dicarboxylic acid, 4-cyclohexene-1,2-dicarboxylic acid, 1-cyclohexene-1-carboxylic acid, 2,6-cyclohexadiene-1,2-dicarboxylic acid, 2-nitrocinnamic acid, vinylacetic acid, 2-chloro-2-butenoic acid, 4-bromo-2-butenoic acid, glutaconic acid, teraconic acid, 5-allyl-2,3-dimethoxybenzoic acid, 2-pentene-1,3,5-tricarboxylic acid, and the like. Preferably, the low molecular weight carboxylic acid reactant will be one having ethylenic unsaturation in a position α,β to at least one carboxyl function. The low molecular weight ethylenically unsaturated carboxylic acid reactants normally will contain up to about 10 carbon atoms. Furthermore, the low molecular weight carboxylic acid reactants usually are selected from aliphataic mono- and dicarboxylic ethylenically unsaturated acid acylating agents. Due to reasons of availability, and their case of reaction, acrylic acid, maleic acid, and maleic anhydride are preferred as (B).

The ethylenically unsaturated aliphatic hydrocarbon and ethylenically unsaturated substituted aliphatic hydrocarbon reactant containing an average of at least about 50 aliphatic carbon atoms, that is, (C), include principally the high molecular weight ethylenically unsaturated petroleum fractions and olefin polymers, particularly polymers of monoolefins having from two to about 20 carbon atoms. As a practical matter, the ethylenically unsaturated aliphatic hydrocarbon and substituted aliphatic hydrocarbon reactants will be polymers or interpolymers of mono- and diolefins because of their ready availability and low cost. Especially useful polymers are the polymers of 1-monoolefins such as polymers of ethylene, propylene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position are also useful. They are illustrated by polymers of 2-butene, 3-pentene, and 4-octene.

Also useful are the interpolymers of the olefin monomers such as those illustrated above with each other as well as with other interpolymerizable olefinic substances such as aromatic olefins, cycloolefins, diolefins, triolefins, etc. Such interpolymers include, for example, those prepared by polymerizing isobutene with styrene; isobutene with butadiene; propene with isoprene; ethylene with piperylene; isobutene with chloroprene; isobutene with p-methylstyrene; ethylene with propylene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene; and the like. Specific examples of such interpolymers include copolymers of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% of isobutene with 2% of cyclohexene and 8% of propene; and copolymer of 80% of ethylene and 20% of propene.

It is also contemplated that these ethylenically unsaturated aliphatic hydrocarbon reactants can contain non-hydrocarbon substituents. These substituents include nitro, halo, lower alkoxy, lower alkyl mercapto, oxo, thioxo, and the like with the proviso that the non-hydrocarbon portion of the reactant does not comprise more than about 10% by weight of the total molecular weight of the reactant. Obviously, since an object of the process is to prepare high molecular weight carboxylic acid acylating agents, carboxyl functions such as carboxylic anhydride groups, e.g.,

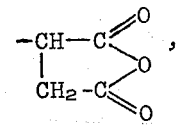

carboxyl groups, carbo(lower alkoxyl) groups, e.g., carbethoxy, carbohalide groups, e.g.,

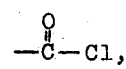

carbamyl, and the like are contemplated as acceptable substituents.

The ethylenically unsaturated aliphatic hydrocarbon reactant and ethylenically unsaturated substituted aliphatic hydrocarbon reactants will have average molecular weights within the range of about 700 to about 200,000, generally about 700 to about 100,000. Preferably, however, their average molecular weights will be in the range of about 700 to about 10,000; usually about 700 to about 5,000. When the aliphatic hydrocarbon reactant or substituted aliphatic hydrocarbon reactant has a molecular weight in excess of about 50,000, the resulting acylating agents and products produced therefrom will impart useful viscosity index improving capabilities to lubricants in addition to dispersant properties.

The low molecular weight monocarboxylic acid reactants (D) which are ethylenically unsaturated monocarboxylic acid acylating agents containing up to about 20 carbon atoms in the acyl moiety are known. Usually they will be ethylenically unsaturated aliphatic monocarboxylic acids. The low molecular weight reactant normally will contain up to about ten carbon atoms in the acyl moiety. The $\alpha, \beta$-ethylenically unsaturated aliphatic monocarboxylic acid acylating agents are preferred as reactant (D). Specific illustrative examples of reactant (D) are those ethylenically unsaturated monocarboxylic acids listed above as being suitable for use in the preparation of (A) as well as those monocarboxylic acids described and illustrated above with respect to (B).

Likewise, the low molecular weight polycarboxylic acid reactants, that is, (E), are known. They are the ethylenically unsaturated polycarboxylic acid reactants containing up to about twenty carbon atoms discussed hereinbefore with respect to (B). The discussion of (B), as it pertains to polycarboxylic acid reactants is applicable to (E). Therefore, no further discussion of (E) is necessary here.

As is apparent from the foregoing discussion of this invention, the corresponding equivalent acylating agents may be substituted for any of the carboxylic acids described hereinbefore. Thus, the anhydrides, the esters with lower aliphatic alcohols, the acyl halides, the anhydrides, and the like may be used in lieu of the carboxylic acid per se.

The monocarboxylic and polycarboxylic acid anhydrides may be obtained by dehydrating the corresponding acids. Dehydration is accomplished by heating the acid to a temperature above about 70°C. preferably in the presence of a dehydration agent, e.g., acetic anhydride. Cyclic anhydrides are usually obtained from polycarboxylic acids having the acid radical separated by no more than three carbon atoms such as substituted succinic and glutaric acids, whereas linear polymeric anhydrides are obtained from polycarboxylic acids having the acid radical separated by four or more carbon atoms.

The acid halides of the monocarboxylic and polycarboxylic acids can be prepared in the conventional manner such as by the reaction of the acids or their anhydrides with a halogenation agent such as a phosphorous tribromide, phosphorus pentachloride, or thionyl chloride. The esters of such acids can be prepared by reacting the acids or their anhydrides with an alcohol such as methanol or ethanol and the like under conventional esterification conditions. Esterification is usually promoted by the use of an alkaline catalyst such as sodium hydroxide or sodium alkoxide or an acidic catalyst such as sulfuric acid.

In reaction mixture (I), the amounts of (A) and (B) are such that the reaction mixture contains at least about 0.5 mole of (B) for each mole of (A). Furthermore, the amount of (B) in the reaction mixture must provide a minimum of one equivalent of carboxylic acid reactant per mole of (A). The number of equivalents in (B), that is the low molecular weight carboxylic acid reactant depends upon the number of carboxyl functions present. Thus, if (B) is a monocarboxylic acid acylating agent such as acrylic acid, ethyl acrylate, acrylic acid chloride, oleic acid, and the like, (B) contains one equivalent per mole. Similarly, when (B) is an ethylenically unsaturated polycarboxylic acid acylating agent, the number of equivalents per mole depends upon the number of carboxyl functions, a dicarboxylic acid acylating agent having two equivalents per mole, a tricarboxylic acid acylating agent having three equivalents per mole, and the like.

The upper limit on the amount of (B) present in the reaction mixture is determined by the identity of the monocarboxylic acid acylating agent (A). Thus, the total number of moles of (B) will now exceed that amount necessary to provide one mole of (B) per 25 aliphatic carbon atoms in the acyl moiety of (A), based on the average molecular weight of the acyl moiety of (A). For example, if the acyl moiety of (A) contained an average of about 250 aliphatic carbon atoms, then the total number of moles of (B) present in the reaction mixture generally will not exceed about ten. Preferably, the amount of (B) will be such that the number of equivalents of (B) will not exceed that amount necessary to provide about one equivalent for each 25 aliphatic carbon atoms in the acyl moiety of (A).

It is also contemplated that the monocarboxylic acid acylating agent (A) can be a mixture of two or more such acylating agents. Likewise, low molecular weight carboxylic acid reactant (B) can be a mixture of two or more ethylenically unsaturated mono- or polycarboxylic acid acylating agents. For example, a mixture of sorbic acid and methacrylic acid; a mixture of cinnamic acid and maleic acid anhydride; a mixture of maleic acid and 2-methylallyl-succinic acid anhydride; or a mixture of all of these. Obviously, from what has been said hereinabove, the amounts of the individual acids comprising these mixtures is not critical provided the overall amounts meet the limitations discussed hereinbefore.

In reaction mixture (II) the amounts of (C), (D), and (E) employed in the reaction mixture is such that the mole ratio of (C):(D):(E) is such that there is at least about 0.5 mole of each of (D) and (E) per mole of (C) with the proviso that the combined amount of (D) and (E) provide a minimum of at least two, preferably at least three, equivalents of low molecular weight mono- and polycarboxylic acid reactant per mole of (C). As discussed hereinabove with reference to (B), the number of equivalents in the low molecular weight mono- and polycarboxylic acid reactants, that is, (D) and (E) per mole of said reactants depends upon the number of carboxyl functions present. Thus, monocarboxylic acid reactants have one equivalent per mole, dicarboxylic acid reactants have two equivalents per mole, tricarboxylic acids have three equivalents per mole, and so forth.

The maximum amounts of (D) and (E) in relation to (C) is that wherein the amount of (D) and (E) provides a total number of moles of low molecular weight mono- and polycarboxylic acid reactants not in excess of about one mole for each 25 aliphatic carbon atoms present in (C). For example, polyisobutylene containing an average of about 500 carbon atoms per mole could be utilized in the reaction mixture containing combined amounts of (D) and (E) sufficient to provide about 20 moles of low molecular weight mono- and polycarboxylic acid reactant per mole of (C). Usually, however, the amounts of (D) and (E) will be such as to provide not more than about one equivalent per 25 aliphatic carbon atoms in (C).

As with the reaction mixture (I), it is contemplated that each of (C), (D) and (E) may be a single reactant or mixture of two or more reactants. For example, (C) can be a mixture of polyisobutylene having an average molecular weight of about 1,800 and polypropylene having an average molecular weight of about 1,000 or a mixture of an ethylene-propylene copolymer having an average molecular weight of about 3,000 and polyisobutylene having an average molecular weight of about 1,200. Similarly, reactant (C) could be an isobutylene-butadiene-1,3(molar ratio-19:1) copolymer having an average molecular weight of 10,000, polyethylene having an average molecular weight of 2,500, and polyisobutylene having an average molecular weight of about 7,500. Likewise, mixtures of mono- carboxylic acid reactants can be used as (D) and mixtures of polycarboxylic acid reactants can be used as (E). Again, the specific amounts of the individual members of these mixtures is not critical as long as the overall limitations set forth above are met.

In order to conduct the processes of the present invention using reaction mixtures (I) or (II), all that is necessary is that these mixtures be contacted with chlorine at a temperature of at least about 140°C. The maximum temperature is critical only to the extent that it should not exceed the minimum decomposition temperature of any member of the reaction mixture or of the products produced. (Such a temperature is referred to herein simply as the decomposition temperature). Ordinarily, temperatures will not exceed 300°C. and preferably will be in the range of about 160°C. to about 260°C. The easiest way to contact the reaction mixture with chlorine is simply to introduce chlorine gas into the reaction mixture, generally by bubbling chlorine gas through the reaction mixture from a subsurface inlet. The minimum amount of chlorine which should be introduced into the reaction mixtures in the case of reaction mixture (I) is that which will provide at least about 0.8, preferably at least about one, mole of chlorine per mole of (B). In the case of reaction mixture (II), at least about 0.8 and preferably at least about one mole of chlorine should be introduced for each mole of the total number of moles of (D) and (E). The presence of minor amounts of conventional polymerization inhibitors in the reaction mixtures will eliminate polymerization of (B) or (D) and (E) if such polymerization becomes a problem. Typical inhibitors include iodine crystals, hydroquinone, di-tert-butyl-p-cresol, and tert-butylcatechol. They can be used in amounts such that they comprise from about 0.001% to about 1% of the weight of (B) or total weight of (D) and (E).

The chlorine should be introduced into the reaction mixtures at such a rate and under conditions which permit it to react with the components of the reaction mixture. This is readily accomplished by introducing the chlorine continuously or intermittently over a period of time with agitation of the reaction mixture (such as by stirring, shaking, sonic vibration, and the like) at a suitable temperature. Depending on the size of the reaction mixture and the total amount of chlorine to be introduced, the addition may be accomplished in a very short period of time such as 0.25 hour or less for small laboratory size reaction mixtures, up to perhaps 24 or more hours for large commercial quantities of reaction mixtures.

It is usually desirable to introduce an excess amount of chlorine gas into the reaction mixtures over and above the minimum specified above. Generally, from about one to about 1.5 moles of chlorine gas will be introduced into the reaction mixtures for each mole of (B) or for each mole of the total number of moles of (D) and (E). Ordinarily, there is no advantage associated with utilizing more than two moles of chlorine gas for each mole of (B) or total number of moles of (D) and (E).

When the reaction mixtures (I) and (II) are fluid at the temperature at which chlorine is introduced therein, it is not necessary to employ a diluent in the process. Indeed, if the diluent is one which is itself subject to chlorination under the conditions of the process, it may react with the chlorine thus necessitating the use of additional amounts of chlorine to obtain the desired reaction. Accordingly, if the reaction mixtures are not fluid or if it is desired for any other reason to use a diluent in these mixtures, halogenated diluents such as hexachlorobenzene, hexachloroethane, carbon tetrachloride, 1,1,2,2-tetrachloro-1,2-difluoroethane, 1,1-dibromo-1,1,2,2-tetrafluoroethane, and the like may be employed. If necessary, the reaction can be conducted under super-atmospheric pressure to keep the diluent in the liquid phase at the reaction temperature. Other conventional diluents can be employed such as the aliaphatic, cycloaliphatic, and aromatic hydrocarbons including benzene, xylene, toluene, cyclohexane, octane, decane, dodecane, and the like. Low viscosity mineral oils are also useful as diluents.

The invention is further described by the following illustrative examples. As used in these examples and elsewhere in the specification and claims, all "percentages" and "parts" refer to percent by weight and parts by weight unless otherwise indicated.

EXAMPLE 1 a. To a reaction mixture containing 2,070 parts (2 moles) of monocarboxylic acid (prepared by reacting chlorinated polyisobutylene with acrylic acid) and 137 parts (1.4 moles) of maleic anhydride which has been preheated to about 180°C. in a reaction vessel equipped with a reflux condenser, there is continuously introduced, through a subsurface inlet, chlorine gas at such a rate that about 1.13 moles of chlorine gas are introduced over 2.25 hours. The temperature during the chlorine introduction is maintained in the range of 180°–240°C. Thereafter, the reaction mixture is cooled to 160°C., stripped to 220°C. at a pressure of 20 mm(Hg), and filtered at 150°C. The filtrate, a clear liquid (1,867 parts), is a desired high molecular weight polycarboxylic acid.

b. The general procedure of (a) is repeated using 1.5 moles of the monocarboxylic acid and 1.2 moles of maleic anhydride and a total of 1.53 moles of chlorine gas is continuously and uniformly introduced over four hours. Filtration of the reaction mixture produces 1,374 parts of filtrate which is the desired high molecular weight carboxylic acid acylating agent.

c. Following the general procedure of (a) 6,000 parts (5.66 moles) of the monocarboxylic acid and 555 parts (5.66 moles) of maleic anhydride are heated in the presence of chlorine gas which is continuously and uniformly introduced over 0.75 hour. Upon filtration, 5,542 parts of filtrate are obtained which is the desired high molecular weight carboxylic acid acylating agent.

d. To a mixture comprising 6,000 parts (5.66 moles) of the monocarboxylic acid of (a) and 833 parts (8.5 moles) of maleic anhydride, there is introduced about 720 parts of chlorine over a 10 hour period while maintaining a temperature of about 150°–160°C. The temperature of the mixture is then raised to about 210°C. over 1.8 hours while an additional 125 parts of chlorine are introduced. Thereafter, the product is maintained at a temperature within the range of about 210°–230°C. while an additional 175 parts of chlorine is introduced over 5 hours. The reaction mixture is then blown with nitrogen gas for 2 hours during which time the temperature drops to 170°C. It is then stripped to 235°C. at a pressure of 25 mm(Hg) and filtered yielding 5,635 parts of filtrate. The filtrate is the desired high molecular weight carboxylic acid acylating agent.

EXAMPLE 2 a. A mixture of 5,700 parts of polyisobutylene having an average molecular weight of 1,900 and 294 parts (3 moles) of maleic anhydride are mixed in a reaction flask fitted with a reflux condenser and heated to about 120°C. at which time about 5 parts of iodine crystals are added. The mixture is then heated to 150°C. and 216 parts (3 moles) of acylic acid are added and then 400 parts (5.65 moles) of chlorine gas are introduced over a period of about 7 hours while maintaining a temperature of 150°–230°C. The reaction mixture is then stripped to a temperature of 215°C. at a pressure of 10 mm(Hg), and cooled to room temperature. The resulting product is the desired high molecular weight carboxylic acid acylating agent.

b. A mixture comprising 1,900 parts of polyisobutylene having an average molecular weight of 1,900, 89 parts (1.25 moles) of acrylic acid, and 98 parts (1 mole) of maleic anhydride to which a few crystals of iodine have been added is heated to 150°C. in a reaction flask fitted with a reflux condenser. Chlorine gas is introduced into the mixture by a subsurface inlet and the temperature is allowed to rise slowly to about 225°C. over 6.25 hours. The mixture is then cooled to 150°C. while additional chlorine gas is introduced. A total of 175 parts (2.46 moles) of chlorine gas is introduced into the reaction mixture. The mixture is blown with nitrogen gas for 0.5 hour while maintaining a temperature of about 150°–165°C. to remove HCl, stripped to a temperature of 210°C. at a pressure of 24 mm(Hg), and filtered producing 2,059 parts of filtrate. The filtrate is the desired high molecular weight carboxylic acid acylating agent.

EXAMPLE 3 a. A mixture comprising 1,500 parts of polyisobutylene having an average molecular weight of about 1000, 108 parts (1.15 moles) of acrylic acid, 88 parts (0.9 mole) of maleic anhydride and a few crystals of iodine are heated to a temperature of 150°C. in a reaction vessel fitted with a reflux condenser at which time chlorine introduction is commenced via a subsurface inlet. The chlorine introduced is continued for 4.25 hours while the temperature is raised to about 207°C. The mixture is cooled to about 150°C. with a very slow rate of chlorine introduction. At this point a total of 127 parts of chlorine had been used. The product is then cooled to room temperature. After 18 hours, the product is heated to 150°C. and chlorine introduction is resumed while the temperature is raised to 233°C. over 2.25 hours. The temperature is lowered to 185°C. over 1.75 hour while maintaining a slow rate of chlorine introduction. Chlorine introduction ceases and nitrogen is introduced into the reaction mixture over 0.5 hour while maintaining a temperature of about 185°C. A total of 164 parts (2.31 moles) chlorine is used. The mixture is then stripped to 200°C. at a pressure of 20 mm(Hg) leaving a residue (1647 parts) which is the desired high molecular weight carboxylic acid acylating agent.

b. Following the general procedure of (a), a total of 164 parts (2.31 moles) of chlorine is introduced into a mixture comprising 1500 parts of polyisobutylene having an average molecular weight of 1,000, 135 parts (1.88 moles) of acrylic acid, and 88 parts (0.9 mole) of maleic anhydride. Chlorination is completed in 6.5 hours. The residue after the stripping operation is the desired high molecular weight carboxylic acid acylating agent.

c. The general procedure of (a) is repeated using 1,500 parts of the polyisobutylene, 119 parts (1.65 moles) of acrylic acidd, and 118 parts (1.2 moles) of maleic anhydride. To this mixture there is added a total of 1.83 parts (2.5 moles) of chlorine gas over about 6.5 hours while maintaining a temperature within the range of 150°C. to 220°C. After stripping, the residue is filtered at a temperature of 150°C. producing 1,486 parts of filtrate which is the desired high molecular weight carboxylic acid acylating agent.

EXAMPLE 4 a. A mixture comprising 1500 parts of polyisobutylene having an average molecular weight of about 1,000 and 118 parts (1.2 moles) of maleic anhydride is heated to about 140°C. at which time chlorine is introduced via a subsurface inlet at a rate of 20 parts per hour for 5 minutes. Chlorine introduction is stopped and 119 parts (1.65 moles) of acrylic acid are added to the reaction mixture at which time chlorine introduction is resumed at a rate of about 20 parts per hour for 0.25 hour while maintaining the temperature within the range of about 140°–148°C. The rate of chlorine introduction is increased to 30–35 parts per hour for 3.75 hours during which time the temperature is raised from 148°C. to 210°C. The product is cooled to 185°C. and stripped to 200°C. at a pressure of 24 mm(Hg). The stripped material is the desired high molecular weight carboxylic acid acylating agent.

b. The general procedure of (a) is repeated using 1,500 parts of the polyisobutylene, 140 parts (1.95 moles) of acrylic acid, 88 parts (0.9 mole) of maleic anhydride, and a total of 219 parts (3.08 moles) of chlorine. The chlorine is introduced at a rate of about 50 parts per hour for 2.75 hours while the temperature is raised from about 145°C. to about 186°C., then at the rate of about 40–45 parts per hour for about 1.7 hours while maintaining a temperature within the range of about 188°–206°C. At that point chlorination is stopped and the mixture is blown with nitrogen for about .15 hour and then stripped to a temperature of 199°C. at a pressure of 29 mm(Hg).

c. A mixture comprising 1,500 parts of the polyisobutylene of (a) and 88 parts (0.9 mole) of maleic anhydride containing a few crystals of iodine is heated to 140°C. at which time chlorine is introduced via a subsurface inlet at a rate of 25 parts per hour for five minutes. Then 140 parts (1.95 moles) of acrylic acid are added and chlorine introduction is resumed at a rate of 30 parts per hour for 20 minutes, and 50 parts per hour for 20 minutes, during which time the temperature is increased from about 140°C. to about 165°C. Chlorination is stopped and 22 parts (0.3 mole) additional acrylic acid is added. Chlorine is again introduced into the mixture at a rate of about 50 parts per hour for 3.5 hours while the temperature is raised from about 165°C. to about 200°C. At that point, chlorine introduction is reduced to the rate of about 35 parts per hour and continued for about 1.25 hours while maintaining a temperature in the range of 200°C. to 215°C. Chlorination is again stopped and the mixture is blown with nitrogen for about 10 minutes and thereafter stripped to a temperature of 200°C. and a pressure of 22 mm(Hg). The residue, weighing 1691 parts, is the desired high molecular weight carboxylic acid acylating agent.

EXAMPLE 5

Following the general procedure of Example 1(a), 3.25 moles of chlorine gas are introduced into a mixture comprising one mole of monocarboxylic acid having an average molecular weight of 2,400 (produced by reacting chlorinated polypropylene with acrylic acid), acrylic acid, and oleic acid. The molecular ratio of the acids in the reaction mixtures is about 1:2:1. The chlorine gas is introduced uniformly and continuously over seven hours while maintaining a temperature of about 180°–200°C.

EXAMPLE 6

Following the general procedure of Example 2(a), 3.6 moles of chlorine are introduced into a mixture comprising an ethylene-propylene copolymer having an average molecular weight of 4500 wherein ethylene units comprise about 40% of the copolymer, 2,4-hexadienoic acid, and 2-methallylsuccinic acid anhydride in which the mole ratio of copolymer to acid to anhydride is about 1:1:2. The chlorine is introduced continuously and uniformly over a period of 5 hours while maintaining a temperature of about 220°–230°C.

EXAMPLE 7

Following the general procedure of Example 2(a), 8.2 moles of chlorine are introduced into a mixture comprising polyisobutylene having an average molecular weight of 8,500, ethyl acrylate, and cinnamic acid. The molar ratio of polyisobutylene to ester to acid is about 1:5:2. The chlorine is introduced uniformly and continuously over 15 hours while maintaining a temperature of about 200°C.

EXAMPLE 8

Chlorine is introduced into a mixture comprising a polyisobutylene-butadiene copolymer having an average molecular weight of the about 55,000 in which the butadiene units comprise about 3% of the total number of isobutylene and butadiene units in the copolymer, acrylic acid chloride, and maleic anhydride in which the molar ratio of copolymer to acid chloride to anhydride is about 1:15:5. Mineral oil in an amount of about 20% by weight based on the weight of the copolymer is used as a diluent. The mineral oil and copolymer are preheated to a temperature of about 150°C. for 2 hours prior to the addition of the ester and anhydride and the introduction of chlorine. A total of 22.5 moles of chlorine are introduced uniformly and continuously over a period of 24 hours while maintaining a temperature of about 170°C.

EXAMPLE 9

Chlorine is introduced into a mixture comprising polyisobutylene having an average molecular weight of 1,500, polypropylene having an average molecular weight of 3,000, acrylic acid, and maleic anhydride in which the molar ratio of polyisobutylene to polypropylene to acid to anhydride is about 2:1:2.5:2.5. Six moles of chlorine are continuously and uniformly introduced over 8 hours while maintaining a temperature of about 220°C.

The acylating agents produced by the process of this invention are mixtures of acylating agents, the specific structures for which are unknown. Accordingly, these high molecular weight carboxylic acid acylating agents are referred to herein in terms of the processes by which they are prepared.

The high molecular weight carboxylic acid acylating agents produced according to the process of this invention are principally useful as intermediates for the preparation of additives for lubricants and fuels. Thus, they can be reacted with various amines, hydroxy compounds, basically reacting metal compounds, or mixtures of any of these to produce acylated nitrogen compounds, esters, metal salts, and the like which are useful as disperant-detergent additives in lubricants and fuels. Moreover, the acylating agents themselves possess some dispersant capabilities when employed in lubricants and fuels and, as pointed out hereinbefore, if the acylating agent has a molecular weight of about 50,000 or more, then it, as well as its derivatives, will impart viscosity index-improving properties to lubricating oils containing it.

By substituting equivalent amounts of other reactants described hereinabove in reference to (A), (B), (C), (D) and (E) for all or a portion of their counterparts in the foregoing illustrative examples, other embodiments of the processes of this invention are readily available. The products produced by such substitutions in the process representative of the high molecular weight acylating agents of the invention.

The amines contemplated as being useful in the preparation of acylated nitrogen derivatives of the high molecular weight carboxylic acid acylating agents are primary or secondary amines characterized by a radical having the configuration

The two remaining valences of the nitrogen atom of the

radical preferably are satisfied by hydrogen, amino, substituted amino, or an organic radical bonded to said nitrogen atom through direct carbon-to-nitrogen linkages. These amines include ammonia, aliphatic monoamines and polyamines, aromatic amines, heterocyclic amines, carboxylic amines, arylene amines, alkylene amines, N-hydroxyalkyl-substituted amines, and the like. Specific amines are methylamine, N-methylethylamine, N-cyclohexyl-aniline, dibutylamine, cyclohexylamine, aniline, di(p-methylphenyl)amine, dodecylamine, octadecylamine, o-phenylenediamine, N,N'-di-(n-butyl)-p-phenylenediamine, morpholine, piperazine, imidazoline, indole, piperidine, hexahydro-1,3,5-triazine, 1-H-1,2,4-triazole, melamine, bis(p-aminophenyl)methane, phenylmethylamine, cyclohexylamine, pyrrolidine, 3-amino-5,6-diphenyl-1,2,4-triazine, 2-octadecyl-imidazoline, 2-phenyl-4-methyl-imidazolidine, oxazolidine, ethanolamine, diethanolamine, 2-heptyl-oxazolidine, N-(2-hydroxyethyl)ethylenediamine, N,N'-bis(2-hydroxyethyl)ethylenediamine, 1-(2-hydroxyethyl)piperazine, monohydroxypropyl-substituted diethylenetriamine, 1-(2-hydroxypropyl)piperazine, di-(hydroxypropyl)-substituted tetraethylenepentamine, N-(3-hydroxypropyl)tetramethylenediamine, N-(aminoalkyl)amines such as tris(aminoethyl)amine, and 1-di(2-aminoethyl)-diethylenetriamine.

The preferred amines are the alkylene polyamines conforming for the most part to the formula

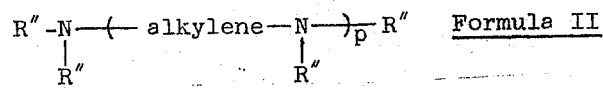  Formula II where p is an integer of one to nine and R'' is hydrogen, alkyl, hydroxyalkyl, aminoalkyl, or

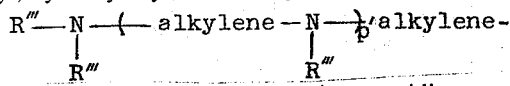

where p' is an integer of one to nine providing p and p' do not exceed nine, R''' is hydrogen, alkyl, hydroxyalkyl, aminoalkyl and at least one R'' per molecule is hydrogen. The alkylene radicals can contain one to seven carbon atoms. These alkylene polyamines include principally methylene polyamines, ethylene polyamines, butylene polyamines, propylene polyamines, pentylene polyamines, hexylene polyamines, heptylene polyamines, octylene polyamines, other polymethylene amines, the cyclic analogs and the higher homologs of these amines such as piperazines and aminoalkyl-substituted piperazines. The hydroxyalkyl-substituted and aminoalkyl-substituted polyamines include those in which the alkyl group is a lower alkyl group, i.e., one having no more than seven carbon atoms. Mixtures of such alkylene polyamines may be used. Indeed, in view of the fact that most commercially available alkylene polyamines are mixtures, such mixtures will normally be employed when it is desired to use alkylene polyamines. The most preferred amines are the alkylene polyamines of Formula II where the R'' variables are hydrogen, aminoalkyl, or

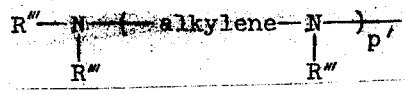

where R''' is hydrogen and the alkylene groups are ethylene or propylene and mixtures of such polyamines.

Another class of especially suitable amines can be described as polyoxyalkylene polyamines. This class of amines can be generically represented by the Formulae

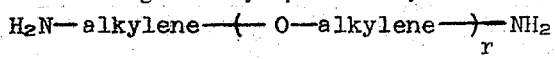

or

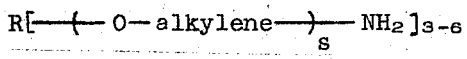

where $r$ has an average value of about 2 to about 40, $s$ has an average value of about 1 to about 12 with the proviso that each $-(O-\text{alkylene})_s$ group on a given molecule may have a different value for $s$, R is a tri- to hexavalent organic radical, usually hydrocarbon radical and preferably a saturated aliphatic hydrocarbon radical such as

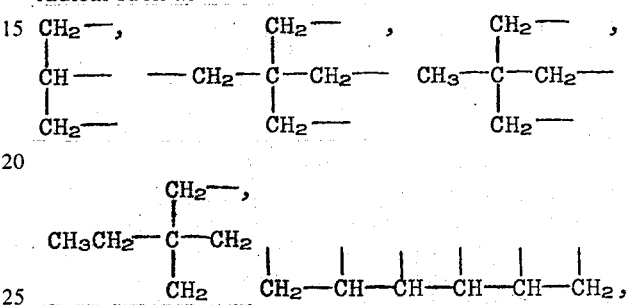

etc., and the alkylene groups may contain from two to eight carbon atoms but normally only two to four carbon atoms. Preferably, the alkylene groups are ethylene or propylene groups or mixtures of these. Such polyoxyalkylene polyamines are commercially available. For example Jefferson Chemical Company, Inc., provides such polyamines under the names JEFFAMINE D-230, D-400, D-1000, D-2000, and T-403.

Other suitable nitrogen compounds which can be used in place of the above-described amines include ureas, thioureas, hydrazines, guanidines, amidines, amides, thioamides, cyanamides, etc. Specific examples illustrating such compounds are: hydrazine, phenylhydrazine, N,N''-diphenylhydrazine, octadecylhydrazine, benzoylhydrazine, urea, thiourea, N-butylurea, stearylamide, oleylamide, guanidine, 1,3-diphenylguanidine, 1,2,3-tributylguanidine, benzamidine, octadecamidine, N,N'-dimethylstearamidine, cyanamide, dicyandiamide, guanylurea, aminoguanidine, etc.

The alcohols and hydroxyaromatic compounds which can be reacted with the high molecular weight acylating agents to produce the esters include mono- and polyhydric alcohols, phenols, and naphthols.

The hydroxy-substituted aromatic compounds may contain substituents in addition to the hydroxy substituents such as halo, lower alkyl, lower alkenyl, alkoxy, nitro, lower alkyl mercapto, and the like. Usually, the hydroxy aromatic compounds will contain one to four hydroxy groups. They are illustrated by the following: phenol, para-chlorophenol, para-nitrophenol, β-naphthol, α-naphthol, cresols, resorcinol, catechol, carvacrol, thymol, eugenol, p,p'-dihydroxybiphenyl, hydroquinone, pyrogallol, phloroglucinol, hexylresorcinol, orcin, guaicol, 2-chlorophenol, 2,4-dibutylphenol, propene tetramer-substituted phenol, didodecylphenol, 4,4'-methylene-bis-phenol, α-decyl-β-naphthol, polyisobutene-(average molecular weight of 1,000)-substituted phenol, the condensation products of alkylphenols with aldehydes and ketones such as the condensation products of heptylphenol with 0.5 mole of formaldehyde and the condensation product of octylphenol with acetone, di(hydroxyphenol)-oxide, di(hydroxyphenol)sulfide, di(hydroxyphenol)disulfide, and 4-cyclohexylphenol. Phenol and aliphatic hydrocarbon-substituted phenols, e.g., alkylated phenols, having up to three aliphatic hydrocarbon substituents are especially preferred. Each of the aliphatic hydrocarbon substituents may contain 100 or more carbon atoms but usually will have from one to 20 carbon atoms. Alkyl and alkenyl groups are the preferred aliphatic hydrocarbon substituents.

Illustrative monohydric alcohols include the aliphatic and cycloaliphatic alcohols of up to about 20 carbon atoms such as methanol, butanol, tert-butyl alcohol, isooctanol, dodecanol, 2-chlorocyclohexanol, cyclohexanol, cyclopentanol, 2-cyclohexene-1-ol, monobutyl ether of ethylene glycol, monoethyl ether of diethylene glycol, benzyl alcohols, β-phenylethanol, allyl alcohol, cetyl alcohol, crotyl alcohol, 1-octanol, lauryl alcohol, 4-methyl-2-pentanol, oleyl alcohol, and the like.

The polyhydric alcohols are preferred reactants for preparing the esters. They generally have from two to ten hydroxyl groups and up to 20 aliphatic carbon atoms. They are quite diverse in structure and chemical composition. Typical polyhydric alcohols are alkylene glycols such as ethylene glycol, propylene glycol, trimethylene glycol, butylene glycol, and polyglycols such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol, monomethyl ether of glycerol, pentaerythritol, 9,10-dihydroxystearic acid, the ethyl ester of 9,10-dihydroxystearic acid, 3-chloro-1,2-propanediol, 1,2-butanediol, 1,4-butanediol, 2,3-hexanediol, pinacol, erythritol, arabitol, sorbitol, mannitol, 1,2-cyclohexanediol, 1,4-cyclohexanediol, 1,4-(2-hydroxyethyl)-cyclohexane, 2-(1-hydroxybutyl)-cyclohexanol, 1,4-dihydroxy-2-nitro-butane, 1,4-di(2-hydroxyethyl)-benzene, dipentaerythritol, copolymers of allyl alcohol and styrene, the carbohydrates such as glucose, arabitose, ramnose, mannose, and galactose, amino alcohols such as di(2-hydroxyethyl)amine, tri-(3-hydroxypropyl)amine, N,N'-di(hydroxyethyl)ethyenediamine, N,N-di-(2-hydroxyethyl)glycine and esters thereof with lower mono- and polyhydric aliphatic alcohols, N,N,N',N'-tetrakis(2-hydroxyethyl)ethylenediamine; N,N,N',N'-tetrakis(2-hydroxypropyl)ethylenediamine; and the like.

Included within this group of polyhydric alcohols are those characterized by the presence of at least two free hydroxyl groups and at least one hydroxyl group which has been esterified with a monocarboxylic acid having from eight to about thirty carbon atoms such as octanoic acid, oleic acid, stearic acid, linoleic acid, dodecanoic acid, or tall oil acid. Examples of such partially esterified polyhydric alcohols are the monooleate of sorbitol, the monooleate of glycerol, the monostearate of glycerol, the distearate of sorbitol, and the didodecanoate of erythritol.

A preferred subclass of alcohols are the polyhydric aliphatic alcohols containing up to ten carbon atoms. This class of alcohols includes glycerol, erythritol, pentaerythritol, glyconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl)-cyclohexanol, 1,10-decanediol, digitalose, and the like. The polyhydric aliphatic alcohols containing at least three hydroxyl groups and up to ten carbon atoms are particularly preferred.

An especially preferred class of polyhydric alcohols are the polyhydric alkanols containing three to ten, especially three to six carbon atoms and having at least three hydroxyl groups. Such alcohols are exemplified by glycerol, β-hydroxymethyl-2-methyl-1,3-propanediol (i.e., trimethylolethane or TME), 2-hydroxymethyl-2-ethyl-1,3-propanediol (i.e., trimethylolpropane or TMP), 1,2,4-butanetriol, 1,2,6-hexanetriol, 1,2,3-pentanetriol, 1,2,3-hexanetriol, 1,2,4-hexanetriol, 1,2,5-hexanetriol, 2,3,4-hexanetriol, mannitol, pentaerythritol, sorbitol, and mixtures thereof. The most preferred polyhydric alkanols are those containing at least four hydroxy groups. This class is exemplified by pentaerythritol, erythritol, threitol, ribitol, xylitol, arabitol, sorbitol, mannitol, and mixtures of two or more of these alcohols.

A preferred member for reaction with the oil-soluble high molecular weight carboxylic acid acylating agents is selected from the group consisting of polyhydric alkanols containing three to ten carbon atoms and having at least 3 hydroxy groups or alkylene polyamines or mixtures of two or more of these alkanols and polyamines.

The alcohol reactant can also be a polyoxyalkylene alcohol which is a demulsifier for aqueous emulsions. The terminology "demulsifier for aqueous emulsions" as used in the present specification and claims is intended to describe those polyoxyalkylene alcohols which are capable of preventing or retarding the formation of aqueous emulsions or "breaking" aqueous emulsions. The terminology "aqueous emulsion" is generic to oil-in-water, water-in-oil, fuel-in-water, and water-in-fuel emulsions. Esters formed from these polyoxyalkylene alcohols impart emulsion resistance and emulsion breaking properties to lubricants and fuels containing them.

The preferred demulsifiers are liquid polyoxyalkylene alcohols and derivatives thereof. The derivatives contemplated are the hydrocarbyl ethers and the carboxylic acid esters obtained by reacting the alcohols with various carboxylic acids. Illustrative hydrocarbyl groups are alkyl, cycloalkyl, alkylaryl, aralkyl, alkylaryl alkyl, etc., containing up to about 40 carbon atoms. Specific hydrocarbyl groups are methyl, butyl, dodecyl, tolyl, phenyl, naphthyl, dodecylphenyl, p-octylphenyl ethyl, cyclohexyl, and the like. Carboxylic acids useful in preparing the ester derivatives are mono- or polycarboxylic acids such as acetic acid, valeric acid, lauric acid, stearic acid, succinic acid, and alkyl or alkenyl-substituted succinic acids wherein the alkyl or alkenyl group contains up to about 20 carbon atoms. Members of this class of alcohols are commercially available from various sources; e.g., PLURONIC and TETRONIC polyols from Wyandotte Chemicals Corporation; POLYGLYCOL 112-2, a liquid triol derived from ethyleneoxide and propyleneoxide available from Dow Chemical Co.; and TERGITOLS, dodecylphenyl or nonylphenyl polyethylene glycol ethers, and UCONS, polyalkylene glycols and various derivatives thereof, both available from Union Carbide Corporation. However, the demulsifiers must have an average of at least one free alcoholic hydroxyl group per molecule of polyoxyalkylene alcohol. An alcoholic hydroxyl group is one attached to a carbon atom that does not form part of an aromatic nucleus.

In this class of preferred polyoxyalkylene alcohols are those polyols prepared as "block" polymers. Thus, a hydroxy-substituted compound $R_x$—(OH)m (where $m$ is 1 to 6, preferably 2 to 3, and $R_x$ is the residue of a mono- or polyhydric alcohol or mono- or polyhydroxy phenol, naphthol, etc.) is reacted with an alkylene oxide,

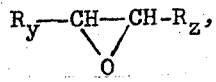

to form a hydrophobic base, $R_y$ being a lower alkyl group of up to four carbon atoms, $R_z$ being H or the same as $R_y$ with the proviso that the alkylene oxide does not contain in excess of ten carbon atoms. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. It is within the skill of the art to prepare such polyols whose molecules are characterized by hydrophobic and hydrophylic moieties present in a ratio rendering them suitable as demulsifiers for aqueous emulsions in various lubricant and fuel compositions. Thus, if more oil- or fuel-solubility is needed in a given lubricant or fuel composition, the hydrophobic portion can be increased and/or hydrophylic portion decreased. If greater aqueous emulsion breaking capability is required, the hydrophylic and/or hydrophobic portions can be adjusted to accomplish this.

Compounds illustrative of $R_x$—(OH)m include aliphatic polyols such as the alkylene glycols and alkane polyols, e.g., ethylene glycol, propylene glycol, trimethylene glycol, glycerol, pentaerythritol, erythritol, sorbitol, mannitol, and the like and aromatic hydroxy compounds such as alkylated mono- and polyhydric phenols and naphthols, e.g., cresols, heptylphenols, dodecylphenols, dioctylphenols, triheptylphenols, resorcinol, pyrogallol, etc.

Polyoxyalkylene polyol demulsifiers which have two to three hydroxyl groups and molecules consisting essentially of hydrophobic portions comprising

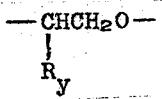

groups where $R_y$ is lower alkyl of up to three carbon atoms and hydrophylic portions comprising —$CH_2CH_2O$— groups are particularly preferred. Such polyols can be prepared by first reacting a compound of the formula $R_x$—(OH)m where $m$ is 2-3 with a terminal alkylene oxide of the formula

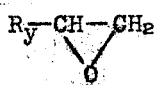

and then reacting that product with ethylene oxide. $R_x$—(OH)m can be, for example, TMP (trimethylolpropane), TME (trimethylolethane), ethylene glycol, trimethylene glycol, tetramethylene glycol, tri-($\beta$-hydroxypropyl)amine, 1,4-(2-hydroxyethyl)-cyclohexane, N,N,N',N'-tetrakis-(2-hydroxypropyl)ethylene diamine, N,N,N',N'-tetrakis (2-hydroxyethyl)-ethylenediamine, naphthol, alkylated naphthol, resorcinol, or one of the other illustrative examples mentioned hereinbefore.

The polyoxyalkylene alcohol demulsifiers should have an average molecular weight of about 1,000 to about 10,000, preferably about 2,000 to about 7,000. The ethyleneoxy groups (i.e., —$CH_2CH_2O$—) normally will comprise from about 5% to about 40% of the total average molecular weight. Those polyoxyalkylene polyols where the ethyleneoxy groups comprise from about 10% to about 30% of the total average molecular weight are especially useful. Polyoxyalkylene polyols having an average molecular weight of about 2,500 to about 6,000 where approximately 10%-20% by weight of the molecule is attributable to ethyleneoxy groups results in the formation of esters having particularly improved properties. The ester and ether derivatives of these polyols are also useful.

Representative of such polyoxyalkylene polyols are the liquid polyols available from Wyandotte Chemicals Corporation under the name PLURONIC Polyols and other similar polyols. These PLURONIC Polyols correspond to the Formula I:

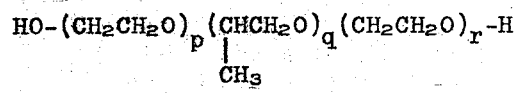

Formula IV wherein $p$, $q$, and $r$ are integers greater than 1 such that the $CH_2CH_2O$ groups comprise from about 10% to about 15% by weight of the total molecular weight of the glycol, the average molecular weight of said polyols being from about 2,500 to about 4,500. This type of polyol can be prepared by reacting propylene glycol with propylene oxide and then with ethylene oxide.

Another commercially available polyoxyalkylene polyol falling within this preferred group is Dow Polyglycol 112-2, a triol having an average molecular weight of about 4,000–5,000 prepared from propylene oxides and ethylene oxides, the ethyleneoxy groups comprising about 18% by weight of the triol. Such triols can be prepared by first reacting glycerol, TME, TMP, etc., with propylene oxide to form a hydrophobic base and reacting that base with ethylene oxide to add hydrophylic portions.

Still another group of polyoxyalkylene alcohol demulsifiers illustrative of the preferred class discussed above are the commercially available liquid TETRONIC polyols sold by Wyandotte Chemicals Corporation. These polyols are represented by the general formula:

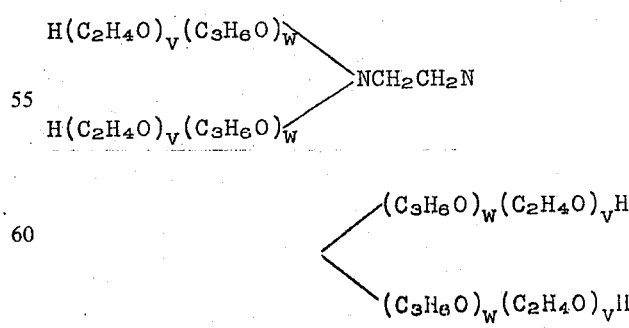

Such polyols are described in U.S. Pat. No. 2,979,528 which is expressly incorporated herein by reference. Those polyols corresponding to the above formula having an average molecular weight of up to about 10,000 wherein the ethyleneoxy groups contribute to the total molecular weight in the percentage ranges discussed above are preferred. A specific example would be such a polyol having an average molecule weight of about 8000 wherein the ethyleneoxy groups account for 7.5%–12% by weight of the total molecular weight. Such polyols can be prepared by reacting an alkylenediamine such as ethylenediamine, propylenediamine, hexamethylenediamine, etc., with propylene oxide until the desired weight of the hydrophobic portion is reached. Then the resulting product is reacted with ethylene oxide to add the desired number of hydrophylic units to the molecules.

When the polyoxyalkylene alcohol demulsifiers are used to prepare esters, they will generally be employed in amounts such that the equivalent ratio of high molecular weight acylating agent to alcohol will be from about 1:0.001 to about 1:0.1.

Basically reacting metal compounds can be reacted with the high molecular weight acylating agent to produce metal salts. Preferably, the basically reacting metal compounds will be zinc or alkali or alkaline earth metal compounds including magnesium compounds. Generally, the metal compound will be a lower alkoxide, an oxide, a hydroxide, a carbonate, a sulfide, a hydrosulfide, or amide. Specific examples of suitable metal compounds for preparing includes barium oxide, barium hydroxide, barium methoxide, calcium ethoxide, strontium isopropoxide, calcium hydroxide, magnesium oxide, sodium hydroxide, potassium hydroxide, sodium methoxide, lithium hydroxide, potassium carbonate, magnesium methoxide, zinc oxide, zinc hydroxide, lead oxide, aluminum oxide, cobalt hydroxide, nickel oxide, and the like.

The high molecular weight polycarboxylic acid acylating agents of this invention enter into reactions with ammonia, amines, basically reacting metal compounds, hydroxyaromatic compounds, alcohols or mixtures of two or more of these to form amine salts, acylated nitrogen compounds, metal salts, esters, and mixtures of these in the same manner as known polycarboxylic acid acylating agents. Thus, the conventional reaction procedures and conditions used in the preparation of ammonium or amine salts, acylated nitrogen compounds, metal salts, and esters can be utilized with the high molecular weight carboxylic acid acylating agents of this invention.

Thus, when reacting the high molecular weight acylating agents with amines, reaction temperatures of from about 0°C. up to the decomposition temperature can be utilized. Usually, temperatures of from about 25°C. up to about 260°C. will be used. At temperatures less than about 80°C. the reaction product of a high molecular weight carboxylic acid is predominantly an amine salt. However, by heating the acylating agent and amine reactant at a temperature in excess of about 80°C., for example at temperatures of 100°C. to 260°C., the product is predominantly a mixture of amides, imides, and/or amidines. In reacting the high molecular weight carboxylic acid acylating agents with amines, the equivalent ratio of acylating agent to amine should be at least about 1:0.5. Generally, there is no advantage associated with using more than about 2.5 moles of amine per equivalent of acylating agent.

In preparing metal salt derivatives of the high molecular weight carboxylic acid acylating agents of this invention, the acylating agent, usually the acid per se or a mixture of the anhydride and water, and a metal reactant such as those enumerated above are simply mixed together for a period of time sufficient for the metal reactant to neutralize at least a portion of the acylating agent. Thus a high molecular weight carboxylic acid acylating agent which are the form of the acids per se can be mixed with, for example, one or more alkali or alkaline earth metal oxides or hydroxides to prepare the desired salts. The temperature for salt formation, as is well-known, is not critical and temperatures within the range of about 0°C. up to but excluding the decomposition temperature are suitable. Ordinarily, temperatures within the range of about 25°C. up to about 260°C. will be employed. The metal salts can also be prepared by the conventional double decomposition reactions. That is, the alkali metal salts of the high molecular weight carboxylic acid can be reacted with a metal halide such as zinc halide, calcium halide, and the like to form the corresponding zinc or calcium salt.

The metal salts can be acidic salts, neutral salts, or basic salts. By "acidic salt" is meant those metal salts of the high molecular weight polycarboxylic acids of this invention wherein less than all of the carboxyl groups have been converted to carboxylic acid salt groups. Acidic salts are formed by reacting less than the stoichiometrically equivalent amount of metal reactant with the acylating agents, generally the carboxylic acids per se. The "neutral salts" are those wherein substantially all the carboxyl functions of the acylating agent have been transformed into metal carboxylate groups. These neutral salts are formed readily by reacting at least a stoichiometrically equivalent amount of metal reactant with the acylating agent. Usually a stoichiometric excess of metal reactant is employed to form the neutral salt, i.e., about 1–10% more than the stoichiometrically equivalent amount of metal reactant. A "basic salt" is a metal salt in which the metal is present in stoichiometrically greater amounts than the high molecular weight carboxylic acid acylating agents. These basic salts are characterized by metal ratios greater than one. The term "metal ratio" is the ratio of the total equivalents of the metal in the salt to the equivalents of carboxylic acid in the high molecular weight carboxylic acid acylating agents. Thus, it is a measure of the stoichiometric excess of metal in the salt. For example, a basic salt can be obtained where one equivalent of high molecular weight carboxylic acid acylating agent and two equivalents of a metal reactant react to form a metal salt; such a salt would have a metal ratio of two.

In preparing basic metal salts, it is sometimes advantageous to treat the reaction mixture in the presence of a promoter, with an acidic gas such as $CO_2$, $SO_2$, $H_2S$, and the like at a temperature within the range of about 0°C. up to the decomposition temperature and generally within the range of about 25°C. up to about 260°C. The amount of basically reacting gas used in these "overbasing" procedures is such as to at least substantially reduce the titratable basicity of the reaction mixture. Such overbasing procedures are well-known in the prior art. Suitable promoters include lower alcohols, e.g., methanol, ethanol, propanol; phenolic compounds, e.g., heptylphenol, octylphenol, nonylphenol, and the like. For example, a basic barium salt having a metal ratio of six can be prepared by carbonating a mixture of high molecular weight polycarboxylic acid of this invention with barium hydroxide, in equivalent ratio of acid to barium hydroxide of about 1:6, in the presence of heptylphenol until the carbon dioxide uptake substantially ceases. The product is an "overbased" or basic salt having a metal ratio of six.

The esterification conditions contemplated by the present invention are those conditions conventionally employed in the preparation of carboxylic acid esters. Thus, high molecular weight carboxylic acid acylating agents of the invention can be contacted with the hydroxyaromatic compounds, alcohols, or mixtures thereof at a temperature of from about 0°C. up to the decomposition temperature but preferably at a temperature of from about 50°C. up to about 260°C. to accomplish esterification. Generally, temperatures of at least 100°C. to about 260°C. are employed in esterification reactions. The ratio of high molecular weight carboxylic acid acylating agent to hydroxyaromatic compound, alcohol, or mixtures thereof should be such that there is at least one-half equivalent of hydroxyaromatic compound, alcohol, or mixtures thereof for each equivalent of acylating agent. Usually there is no advantage in using more than about 1.5 moles of hydroxyaromatic compound, alcohol, or mixtures thereof per equivalent of acylating agent.

The esterification conditions contemplated by this invention include the use of esterification catalysts to promote the esterification reaction. Suitable catalysts include sulfuric acid, pyridine hydrochloride, hydrochloric acid, benzene sulfonic acid, p-toluene sulfonic acid, phosphoric acid, and other known esterification catalysts. The catalyst, present, can be employed in amounts of from about 0.01% to about 5% by weight based on the total weight of acylating agent and alcohol present in the reaction mixture.

In any of the foregoing reactions involving the use of the high molecular weight carboxylic acid acylating agents of this invention, substantially inert organic liquid diluents may be used to facilitate mixing, temperature control, and handling of the reaction mixture. Suitable diluents include aliphatic, cycloaliphatic, and aromatic hydrocarbons as well as the corresponding halogenated hydrocarbons, particularly chlorinated hydrocarbons. These diluents are exemplified by benzene, toluene, xylene, chlorobenzenes, hexane, heptane, cyclohexane, or mixtures of these. Mineral oils particularly low viscosity mineral oils are very good diluents. Other organic solvents can also be employed such as ethers, sulfoxide, sulfones, and the like. Where one or more of the reactants themselves are liquid at the reaction temperature, the reactant itself functions as a diluent and it may be convenient sometimes to employ an excess amount of the reactant to serve this purpose.

Because reference is often made to the number of equivalents of a given reactant in the present specification, particularly in the following examples, it may be helpful to explain and illustrate what is meant by the term "equivalent" with respect to each class of reactants as the term is used herein. The number of equivalents present in the high molecular weight polycarboxylic acid acylating agents of the invention depends upon the number of carboxyl functions present in the acylating agents. Thus, if the acylating agent has an average of three carboxyl functions

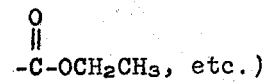

per molecule, it has an average of three equivalents per mole. For example, if a monocarboxylic acid having an average molecular weight of 5,000 is reacted with maleic acid anhydride in the presence of chlorine according to the present invention producing a reaction product having an average of 4.6 carboxyl functions per molecule of monocarboxylic acid starting material, that acylating agent has an equivalent weight of about 1,100.

A nitrogen-containing reactant, such as an amine reactant, is regarded as having a number of equivalents per mole corresponding to the average number of

groups per molecule. Thus, ammonia has one equivalent per mole; urea, hydrazine, ethylenediamine, and piperazine have two equivalents per mole; and tetraethylene pentamine has five equivalents per mole. Mixtures of nitrogen-containing reactants such as mixtures of alkylene polyamines are regarded as having an equivalent weight equal to the weight of the mixture divided by the number of nitrogen atoms present. For example, 1,000 parts of a polyethylene polyamine mixture containing 37% by weight nitrogen has an equivalent weight of about 38.

In like manner, hydroxyaromatic compounds and alcohols have equivalent weights equal to their molecular weights divided by the number of —OH groups per molecule. Or, from another viewpoint, they possess a number of equivalents per mole equal to the number of —OH groups. Thus, pentaerythritol has four equivalents per mole and an equivalent weight of 34. Phenol has one equivalent per mole so that its equivalent weight equals its molecular weight.

Metal reactants have an equivalent weight equal to their molecular weight divided by the product of the number of metal atoms per molecule of reactant times the valence of the metal. Since most of the metal reactants have only one metal per atom per molecule, the equivalent weight of the metal reactant is normally the molecular weight divided by the valence of the metal. Stated differently, a metal reactant normally has a number of equivalents per mole equal to the valence of the metal. For example, calcium hydroxide, zinc chloride, and barium oxide have two equivalents per mole; sodium hydroxide and lithium hydroxide have one equivalent per mole.

From what has been said hereinabove, it will be apparent to those skilled in the art that the reaction products produced by reacting the high molecular weight polycarboxylic acid acylating agents of this invention with various hydroxyaromatic compounds, alcohols, nitrogen-containing reactants, metal reactants, and the like will, in fact, be mixtures of various reaction products. This is especially apparent in view of the fact that the high molecular weight polycarboxylic acid acylating agents themselves are mixtures of carboxylic acid acylating agents. For example, if a high molecular weight polycarboxylic acid acylating agent such as the carboxylic acid per se is reacted with sorbitol, the esterification product can contain esters wherein only one hydroxyl group of the sorbitol has been esterified, esters wherein two or more of the hydroxy groups of the sorbitol have been esterified by the same or different acylating agents, esters where all of the carboxyl groups of a single molecule of acylating agent have been esterified, esters where less than all of the carboxyl groups on the molecule of acylating agents have been esterified, and the like. However, for purposes of the present invention it is not necessary to know the specific structure of each component of the reaction mixtures produced since it is not necessary to isolate these components in order to use them as detergent-dispersant additives in lubricants and fuels.

While the high molecular weight polycarboxylic acid acylating agents themselves possess some dispersant characteristics and can be used as dispersant additives in lubricants and fuels, best results are achieved when at least about 30% of the carboxyl functions of the acylating agents have been converted to metal salts, esters, acylated amine groups such as amides, imides, amidines, and the like. Preferably, at least 50% of the carboxyl functions will be so converted and in many instances, it is desirable that substantially all of the carboxyl functions be so converted. Furthermore, it is not necessary that all the carboxyl functions of the high molecular weight polycarboxylic acid acylating agents be converted to the same derivative or even the same type of derivative. Thus, the acylating agents may be first reacted with one or more alcohols to convert a portion of the carboxyl functions to ester groups and thereafter this ester product can be reacted with one or more amines and/or one or more metal reactants to convert all or a portion of the remaining carboxyl functions to acylated amine groups such as amides, imides, amidines, amine salt groups, and the like or metal salt groups.

The following examples illustrate the use of the high molecular weight polycarboxylic acid acylating agents of this invention in the preparation of acylated nitrogen compound, esters, metal salts, and the like.

EXAMPLE 10

A mixture comprising 1215 parts of the acylating agent produced according to Example 1(b), 151 parts of pentaerythritol, and 39 parts of a polyoxyalkylene alcohol demulsifier is heated to about 200°C. with nitrogen blowing over 0.7 hour and thereafter is maintained at a temperature within the range of about 200°–216°C. for about 4.5 hours with continued nitrogen blowing. About 19 parts of water are evolved during the esterification reaction. Thereafter, 8 parts of a commercial polyethylene polyamine mixture (sufficient polyethylene polyamine to provide about 0.09 equivalents of amine for each equivalent of acylating agent employed initially) is added over a 0.25 hour period while maintaining a temperature of about 210°C. The material is then maintained at a temperature of about 210°–216°C. for 1.5 hours with nitrogen blowing during which time an additional one part of water is evolved. Then 1,140 parts of low viscosity mineral oil is added cooling the mixture to a temperature of about 130°C. The mixture is filtered at that temperature yielding 2,218 parts of filtrate. The filtrate being an oil solution of the desired mixed esteracylated amine reaction product. The filtrate is characterized by a nitrogen content of about 0.12%.

The polyoxyalkylene alcohol demulsifier used in this example is a polyoxyalkylene triol which can be prepared by reacting glycerol, trismethylolaminoethane, or trismethylolaminopropane with propylene oxide and thereafter reacting that first product with ethylene oxide so as to produce a triol having an average molecular weight within the range of about 4,000–5,000 in which the ethylene oxide units account for about 18% by weight of the product and the propylene oxide units account for about 82% by weight of the product.

EXAMPLE 11

A mixture comprising 1,129 parts of the high molecular weight polycarboxylic acid acylating agent of Example 2(b), 100 parts of pentaerythritol, 26 parts of the polyoxyalkylene alcohol demulsifier described in Example 10, and 943 parts of oil are heated to about 200°C. over 0.75 hour with nitrogen blowing. The mixture is maintained at a temperature within the range of about 203°–213°C. for 4 hours with continued nitrogen blowing during which time 10 parts of water are evolved. To the esterification reaction product is then added 16 parts of a commercial polyethylene polyamine mixture (sufficient to provide about 0.011 equivalent of amine for each equivalent high molecular weight carboxylic acid acylating agent initially employed. The mixture is then maintained at a temperature of about 210°–213°C. for an additional hour with nitrogen blowing during which time 4 parts of water are evolved. Nitrogen blowing is discontinued and an additional 943 parts of low viscosity mineral oil are added. The mixture is then filtered at a temperature of 120°–130°C. yielding 2781 parts of filtrate which is an oil solution of the desired mixed ester-acylated amine product. The filtrate is characterized by a nitrogen content of 0.19%.

EXAMPLE 12

A mixture comprising 1,288 parts of the high molecular weight polycarboxylic acid acylating agent of Example 3(a), 136 parts of pentaerythritol, and 1150 parts of low viscosity mineral oil are heated to 200°C. and maintained at a temperature within the range of 200°–217°C. for 8 hours. Thereafter the esterification reaction mixture is cooled to 135°C. and filtered yielding 2,337 parts of filtrate. The filtrate is an oil solution of the desired esters. The filtrate is characterized by the presence of 1.47% by weight of unesterified hydroxyl groups as is expected from the fact that the ratio of acylating agent to pentaerythritol is such that there is a stoichiometric excess, on an equivalent basis, of alcohol.

EXAMPLE 13

Following the general procedure of Example 12, 983 parts of the high molecular weight polycarboxylic acid acylating agent of Example 3(b), 116 parts of pentaerythritol and 900 parts of low viscosity mineral oil are heated for seven hours at a temperature within the range of 200°–218°C. with nitrogen blowing during which time about 17 parts of water is evolved. The esterification product is cooled to about 135°C. and filtered producing 1,696 parts of filtrate. The filtrate is an oil solution of the desired esters characterized by an unesterified hydroxyl content of about 1.48% by weight.

EXAMPLE 14

A mixture comprising 1,036 parts of the high molecular weight polycarboxylic acid acylating agent of Example 3(c), 136 parts of pentaerythritol, and 945 parts of low viscosity mineral oil are heated at a temperature of about 205°–225°C. for 5 hours with nitrogen blowing during which time about 18 parts of water are evolved. The esterification reaction mixture is then cooled to 135°C. and filtered yielding 1,899 parts of filtrate which is an oil solution of the desired esters.

EXAMPLE 15

A mixture comprising 672 parts of the high molecular weight polycarboxylic acid acylating agent of Example 4(c), 82 parts of pentaerythritol, and 21 parts of the polyoxyalkylene alcohol of Example 10 are maintained at a temperature of about 209°–220°C. for 4 hours during which time about 14 parts of water are evolved. To the esterification reaction product there is added 6.5 parts of a commercial polyethylene polyamine mixture sufficient to provide 0.13 equivalents of amine per equivalent of acylating agent initially employed. The resulting mixture is then heated at about 209°–216°C. with nitrogen blowing for about 2 hours at which time 630 parts of mineral oil are added resulting in lowering the temperature of the mixture to about 138°C. The reaction mixture is then filtered at this temperature producing 1,215 parts of filtrate. The filtrate is an oil solution of the desired mixed ester-acylated amine product and is characterized by a nitrogen content of about 0.16% and an unesterified hydroxyl content of about 1.25%.

EXAMPLE 16

A mixture comprising the high molecular weight polycarboxylic acid acylating agent of Example 1(a), phenol, (equivalent ratio of acylating agent to phenol being about 1:1.1), toluene sulfonic acid monohydrate, and xylene is prepared so that the toluene sulfonic acid monohydrate comprises about 2.9% by weight of the total weight of acylating agent and phenol and xylene comprises about 30% by weight of the total reaction mixture. This mixture is then heated for about 33 hours while maintaining a temperature in the range of 153°–154°C. The esterification product is then cooled to 50°C. and sufficient sodium hydroxide is added to neutralize the toluene sulfonic acid. The reaction mixture is then stripped to a temperature of 223°C. at a pressure of 21 mm(Hg). The stripped product is then mixed with low viscosity mineral oil in amounts such that the oil comprises about 40% by weight of the total mixture and filtered at 110°C. The filtrate is an oil solution of the desired phenol esters.

EXAMPLE 17

An acidic barium salt of the high molecular weight polycarboxylic acid acylating agent of Example 5 is prepared by heating a 30% mineral oil solution of that acylating agent and barium hydroxide with stirring for seven hours while maintaining a temperature within the range of about 120°–125°C. using an equivalent ratio of acylating agent to barium hydroxide of 1:0,75.

EXAMPLE 18

Following the general procedure of Example 12, the high molecular weight polycarboxylic acid acylating agent of Example 6 is reacted with sorbitol in an equivalent ratio of acylating agent to sorbitol of about 1:0.5. The acidic ester thus produced is then neutralized with calcium hydroxide by heating the acidic ester and calcium hydroxide in the presence of a small amount of water under reflux conditions for 1.5 hours. This mixture is then dried by heating at about 125°C. for about 0.5 hour and thereafter filtered. The filtrate is an oil solution of the desired mixed-ester metal salt of the high molecular weight polycarboxylic acid acylating agent.

EXAMPLE 19

Following the general procedure of Example 12, the high molecular weight polycarboxylic acid acylating agent of Example 1(d) is reacted with polypropylene glycol having an average molecular weight of about 500 in an equivalent ratio of acylating agent to glycol of about 1:2.

EXAMPLE 20

The high molecular weight polycarboxylic acid acylating agent of Example 8 is reacted with a commercial mixture of ethylene polyamines having an equivalent weight of about 41 using an equivalent ratio of acylating agent to ethylene polyamine mixture of about 1:1. The reaction is conducted by mixing the oil solution of the acylating agent of Example 8 with the amine mixture in the presence of toluene at a temperature of about 110°–120°C. for 3 hours, the water produced from the acylation reaction being removed as an azeotrope with toluene. When substantially all water has been thus removed, the reaction mixture is stripped by heating to 150°C. at a pressure of 20 mm(Hg). The stripped product is an oil solution of the desired acylated polyamine mixture.

EXAMPLE 21

The acylating agent of Example 9 is converted to the sodium salt by refluxing a mixture of the acylating agent and sodium hydroxide in an equivalent ratio of acylating agent to sodium hydroxide of about 1:1.1 in the presence of a minor amount of water using xylene as a diluent. After no further water is evolved, the reaction product is filtered. To the filtrate there is added an equal molar mixture of water and zinc chloride in amounts sufficient to provide one equivalent of zinc for each equivalent of sodium in the sodium salt. The resulting mixture is heated at the reflux temperature for two hours, dried by heating it to a temperature of about 120°C. for 0.75 hour, and filtered. The filtrate is a xylene solution of the desired zinc salt.

EXAMPLE 22

A 30% oil solution of the acylating agent of Example 3(c) is heated to 140°C. While maintaining the temperature of the solution at 140°–150°C., an equal molar mixture of triethylenetetramine and diethylenetriamine are added over 0.5 hour in an amount sufficient to provide an equivalent ratio of acylating agent to amine of about 1:0.6. The reaction mixture is maintained at a temperature of about 150°–155°C. for an additional 2.5 hours and thereafter nitrogen is bubbled through the reaction mixture for three hours while maintaining the same temperature. The reaction mixture is filtered, the filtrate being an oil solution of the desired acylated polyamine mixture.

EXAMPLE 23

A mixture comprising a 40% oil solution of the acylating agent of Example 5 and a mixture of commercially available ethylene polyamines having an equivalent weight of about 38 in a ratio of acylating agent to amine of about 1:1.5 is heated from room temperature to about 150°C. over 1.5 hours and maintained at that temperature for an additional 5 hours while blowing nitrogen gas through the mixture. The reaction mixture is filtered at a temperature of about 110°–120°C. The filtrate is an oil solution of the desired acylated polyamine mixture.

EXAMPLE 24

A mixture comprising the acylating agent of Example 4(c), a mixture of ethylene polyamines, and xylene is heated at the reflux temperature for five hours. The ratio of equivalents of acylating agent to ethylene polyamines is about 1:5 and the amount of xylene employed is such that it comprises about 35% by weight of the total weight of reaction mixture. Thereafter, the reaction mixture is filtered. The filtrate is then heated at reduced pressure to remove xylene, this stripped material being the desired high molecular weight polycarboxylic acid acylated polyamine mixture.

EXAMPLE 25

Following the general procedure of Example 12, the high molecular weight polycarboxylic acid acylating agent of Example 1(c) is reacted with a mixture of glycerol and mannitol in an equivalent ratio of acylating agent to glycerol to mannitol of about 1:0.2:0.4. After heating this reaction mixture at 150°C. for about 6 hours, it is filtered. The filtrate is an oil solution of the desired high molecular weight polycarboxylic acid acidic esters of glycerol and mannitol.

EXAMPLE 26

To a mixture comprising 1120 parts of the polycarboxylic acid acylating agent of Example 4(c), 550 parts of toluene, and 1275 parts of mineral oil there is added at 50°C. an aqueous solution of sodium hydroxide containing 95 parts sodium hydroxide and 100 parts water. This mixture is then maintained at a temperature of about 100°C. for 3 hours and then dried. To this dried mixture there is added a solution containing 143 parts of calcium chloride and 175 parts water. This mixture is maintained at a temperature of 100°C. for 3 hours. This mixture is then dried and 278 parts of methanol and 126 parts calcium hydroxide are added. While maintaining a temperature of this mixture at about 50°C., carbon dioxide is bubbled there through until the carbonated mixture is substantially neutral. Carbonation is terminated, the mixture is dried by heating to 150°C., and filtered. The filtrate is an oil solution of the desired calcium overbased salt having a metal ratio of about 1.8.

The foregoing illustrative examples demonstrate the applicability of conventional acylating procedures to the preparation of esters, acylated nitrogen compound, and metal salts using the high molecular weight carboxylic acid acylating agents of this invention. By substituting for all or a portion of the reactants used in the foregoing examples their equivalent acylating agents, hydroxyaromatic compounds, alcohols, and metal reactants as previously described hereinbefore, other illustrative embodiments of this invention are readily achieved.

The acylating agents and their derivatives of this invention as discussed and exemplified hereinabove normally will be employed in mineral lubricating oil base lubricant compositions. However, other lubricating oils, natural and synthetic, of lubricating viscosity can be used as the base oil. They may by employed in amounts constituting from about 0.001% to about 20% or more by weight of the finished lubricant; more often, about 0.05% to about 10% by weight. Those derivatives which contain ester groups derived from the polyoxyalkylene alcohol demulsifiers are characterized by the ability to resist the formation of aqueous emulsions when used as dispersant-detergent additives in lubricants and also in fuels.

Natural oils include animal oils and vegetable oils (e.g., castor oil, lard oil) as well as sovent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers. chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., bi-phenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1,000, diphenyl ether of polyethylene glycol having a molecular weight of 500–1,000, diethyl ether of polypropylene glycol having a molecular weight of 1,000–1,500, etc.) or mono-and polycarboxylic esters thereof, for example, the acetic acid esters, mixed $C_3$-$C_8$ fatty acid esters, or the $C_{13}$ Oxo acid diester of tetraethylene glycol. Another suitable class of synthetic lubricating oils comprises the esters of dicarboxylic acids (e.g, phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or poly-aryloxysiloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)- silicate, hexyl-(4-methyl-2-pentoxy)-disiloxane, poly(methyl)- siloxanes, poly(methylphenyl)-siloxanes, etc.). Other synthetic lubricating oils include liquid esters of phosphorous-containing acids (e.g., tricresyl phosphate, trioctyl phosphate, diethyl ester of decane phosphonic acid, etc.), polymeric tetra-hydrofurans, and the like.

As mentioned supra, the present invention contemplates the presence of other additives in the lubricating compositions in addition to the ester-containing compositions described above. Such additives include, for example, ashless dispersants, detergents of the ash-containing type, viscosity index improving agents, pour-point depressants, anti-foam agents, extreme pressure agents, rust inhibitors, oxidation and corrosion inhibitors, and the like. These other additives can be employed in the amounts they are normally employed in lubricant compositions.

The ash-containing detergents are exemplified by oil-soluble neutral and basic salts of alkali or alkaline earth metals with sulfonic acids, carboxylic acids or organic phosphorous acids characterized by at least one direct carbon-to-phosphorous linkage such as those prepared by the treatment of an olefin polymer (e.g., polyisobutene having a molecular weight of 1,000) with a phosphorizing agent such as phosphorus trichloride, phosphorus heptasulfide, phosphorus pentasulfide, phosphorus trichloride and sulfur, white phosphorus and a sulfur halide, or phosphorothioate chloride. The most commonly used salts of such acids are those of sodium, potassium, lithium, calcium, magnesium, strontium and barium.

The term "basic salt" is used to designate the metal salts wherein the metal is present in stoichiometrically larger amounts than the organic acid radicals. The commonly employed methods for preparing the basic salts involves heating a mineral oil solution of an acid with a stoichiometric excess of a metal neutralizing agent such as a metal oxide, hydroxide, carbonate, bicarbonate, or sulfide at a temperature above about 50°C. and filtering the resulting mass. The use of a "promoter" in the neutralization step to aid in the incorporation of a large excess of metal likewise is known. Examples of compounds useful as the promoter include phenolic substances such as phenol, naphthol, alkylphenols, thiophenols, sulfurized alkylphenols, condensation products of formaldehyde with such phenolic substances, alcohols such as methanol, 2-propanol, octyl alcohol, Cellusolve, Carbitol, ethylene glycol, cyclohexyl alcohol; amines such as aniline, phenylene diamine, phenothiazine, phenyl-beta-naphylamine, and dodecylamine. A particularly effective method for preparing the basic salts comprises mixing an acid with an excess of a basic alkaline earth metal neutralizing agent, a phenolic promoter compound, and a small amount of water, and carbonating the mixture at an elevated temperature such as 60°C. to 200°C.

Extreme pressure agents and corrosion-inhibiting and oxidation-inhibiting agents are exemplified by chlorinated aliphatic hydrocarbons such as chlorinated wax; organic sulfides and polysulfides such as benzyldisulfide, bis-(chlorobenzyl)-disulfide, dibutyl tetrasulfide, sulfurized sperm oil, sulfurized methyl ester or oleic acid, sulfurized alkylphenol, sulfurized dipentene, and sulfurized terpene; phosphosulfurized hydrocarbons such as the reaction product of phosphorous sulfide with turpentine or methyloleate; phosphorous esters including principally dihydrocarbon and trihydrocarbon phosphites such as dibutylphosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene-(molecular weight 500)-substituted phenyl phosphite, diisobutyl-substituted phenyl phosphite; metal thiocarbamates such as zinc dioctyldithiocarbamate and barium heptylphenyl dithiocarbamate; Group II metal phosphorodithioates such as zinc dicyclohexyl phosphorodithioate, zinc dioctyl phosphorodithioate, barium di(heptylphenyl)-phosphorodithioate, cadmium dinonyl phosphorodithioate, and a zinc salt of a phosphorodithioic acid produced by the reaction of phosphorus pentasulfide with an equal molar mixture of isopropyl alcohol and n-hexyl alcohol.

When employed as fuel additives, the base fuel will generally be a normally liquid petroleum distillate fuel such as diesel fuel, aviation fuel, gasoline, kerosene, fuel oil and the like. Usually, the amounts of acylating agent or derivative of this invention used in fuels will be such that they constitute from about 0.0001% to about 5% by weight of the finished fuel. For fuels, the amount of additive will generally be in the range of about 0.001% to about 1% by weight of the finished fuel. The optimum amount to be employed in a specific fuel will depend on the particular fuel and the amounts and kinds of other additives present in the fuel.

Other conventional fuel additives such as smoke suppressants (for example, the ash-containing detergents described above, particularly overbased barium detergents) ashless dispersants, anti-icing agents, anti-stalling agents, lead scavengers, lead alkyl anti-knock additives, dyes, corrosion inhibitors, lead octane appreciators, etc., such as tetraethyl lead, tetramethyl lead, dimethyldiethyl lead, tetravinyl lead, t-butyl acetate, tri-($\beta$-chloroethyl)phosphate, isopropanol, and the like.

The following are illustrative of the lubricant and fuel compositions of this invention.

EXAMPLE I

SAE 20 mineral lubricating oil containing 0.001% of the product of Example 1(b).

EXAMPLE II

SAE 10W-30 mineral lubricating oil containing 0.25% of the product of Example 4(b) and 0.1% of phosphorus as the barium salt of di-n-nonylphosphorodithioic acid.

EXAMPLE III

SAE 40 mineral lubricating oil containing 0.1% of the product of Example 20 and 0.15% of the zinc salt of an equimolar mixture of di-cyclohexylphosphorodithioic acid and di-isobutyl phosphorodithioic acid.

EXAMPLE IV

SAE 30 mineral lubricating oil containing 0.5% of the product of Example 19.

EXAMPLE V

SAE 10W-30 mineral lubricating oil containing 1.5% of the product of Example 15 and 0.05% of phosphorus as the zinc salt of a phosphorodithioic acid prepared by the reaction of phosphorus pentasulfide with a mixture of 60% (mole) of p-butylphenol and 40% (mole) of n-pentyl alcohol.

EXAMPLE VI

SAE 10W-30 mineral lubricating oil containing 2% of the product of Example 10, 0.06% of phosphorus as zince di-n-octylphosphorodithioate, and 1% of sulfate ash as barium mahogany sulfonate.

EXAMPLE VII

SAE 30 mineral lubricating oil containing 5% of the product of Example 12, 0.1% of phosphorus as the zinc salt of a mixture of equi-molar amounts of di-isopropylphosphorodithioic acid and di-n-decylphosphorodithioic acid, and 2.5% of sulfate ash as a basic barium detergent prepared by carbonating at 150°C. a mixture comprising mineral oil, barium di-dodecylbenzene sulfonate and 1.5 moles of barium hydroxide in the presence of a small amount of water and 0.7 mole of octylphenol as the promoter.

EXAMPLE VIII

SAE 10 mineral lubricating oil containing 2% of the product of Example 18, 0.075% of phosphorus as the adduct of zinc di-cyclohexylphosphorodithioate treated with 0.3 mole of ethylene oxide, 2% of a sulfurized sperm oil having a sulfur content of 10%, 3.5% of a poly-(alkyl methacrylate) viscosity index improver, 0.02% of a poly-(alkyl methacrylate) pour point depressant, 0.003% of a poly-(alkyl siloxane) anti-foam agent.

EXAMPLE IX

SAE 50 mineral lubricating oil containing 1.5% of the filtrate of Example 10, 1.5% of an acylated nitrogen composition prepared by reacting in about a 1:1 equivalent ratio at about 150°C. polyisobutenyl (M.W.-1100)-substituted succinic anhydride with a commercial polyethylene polyamine mixture having an average composition corresponding to that of tetraethylene pentamine, and 0.06% of phosphorus as the zinc salt of di-n-octyl-phosphorodithioate.

EXAMPLE X

SAE 10W-30 mineral lubricating oil containing 5% of the filtrate of Example 9(b), 0.075% of phosphorus as the zinc salt of a mixture of equimolar amounts of diisopropyl phosphorodithioic acid and di-n-decylphosphorodithioic acid, and 2.0% sulfate ash as a basic barium detergent prepared by carbonating at 150°C. a mixture comprising mineral oil, one mole of barium didecylbenzene sulfonate, and 1.5 moles of barium hydroxide in the presence of 0.7 mole of octylphenol as the promoter.

EXAMPLE XI

SAE 10 mineral lubricating oil containing 3.5% of the filtrate of Example 11, 0.06% phosphorus as the adduct of one mole of zinc dicyclohexylphosphorodithioate and 0.3 mole of ethylene oxide, 2% of sulfurized sperm oil having a sulfur content of 10%, 3% of a poly-(alkylmethacrylate) viscosity index improver, and 0.003% of a poly(alkylsiloxane) antifoam agent.

EXAMPLE XII

SAE 20 mineral lubricating oil containing 0.5% of the filtrate of Example 18, 2.5% of the filtrate of Example 12, 0.08% of phosphorus as the zinc salt of a phosphorodithioic acid prepared by the reaction of phosphorus pentasulfide with an equimolar mixture of n-butyl alcohol and dodecyl alcohol, 2.5% of a basic barium detergent prepared by carbonating a mineral oil solution containing one mole of sperm oil, 0.6 mole of octylphenol, two moles of barium oxide, and a small amount of water at 150°C.

EXAMPLE XIII

A synthetic lubricating oil consisting essentially of the diethylether of polypropylene glycol having an average molecular weight of about 1,500 containing 0.75% of the filtrate of Example 14.

EXAMPLE XIV

Gasoline containing 0.001% of the product of Example 1(b).

EXAMPLE XV

Diesel fuel containing 0.025% of the filtrate of Example 25.

EXAMPLE XVI

Kerosene containing 0.07% of the filtrate of Example 18.

EXAMPLE XVII

Gasoline containing 0.001% of the filtrate of Example 12.

It is also contemplated that the high molecular weight acylating agents and their derivatives as described hereinbefore will be prepared in concentrated, substantially stable dispersions or solutions in substantially inert, non-polar organic liquid diluents such as lubricating oils and normally liquid fuels as described hereinbefore. Other such diluents include aliphatic, cycloaliphatic, and aromatic hydrocarbon diluents such as alkanes, cycloalkanes, benzenes, naphthenes, and the like and corresponding halogenated hydrocarbons. Specific examples include heptane, octane, nonane, cyclohexane, methylcyclohexane, cyclopentane, benzene, ethylbenzene, toluene, xylenes, chlorobenzenes, and the like. Other diluents include ethers, ketones, alcohols, and the like. Such substantially inert, nonpolar organic liquid diluents are well known to those skilled in the art and require no further description herein. The amount of the high molecular weight carboxylic acid acylating agents and/or derivatives thereof generally present in such concentrates will be from about 5% to about 90%, usually about 5% to about 70% by weight of the total weight of the concentrate. These concentrates are then added to lubricating oils or normally liquid fuels in amounts sufficient to provide the desired amount of high molecular weight carboxylic acid acylating agents and/or derivatives thereof in the final lubricant or fuel composition. Moreover, the concentrates can contain other conventional additives as described hereinbefore.

What is claimed is:

1. A lubricant or fuel composition comprising, respectively, a major amount of a lubricating oil or a normally liquid fuel and 0.0001% to 20% by weight of at least one oil-soluble high molecular weight carboxylic acid acylating agent prepared by a process comprising intimately contacting chlorine with a reaction mixture at a temperature of at least 140°C. and up to the decomposition temperature, said reaction mixture being selected from the group consisting of:

I. A first reactant which is at least one (A) monocarboxylic acid acylating agent containing an average of at least about 50 aliphatic carbon atoms in the acyl moiety exclusive of the carboxyl functions and at least one (B) low molecular weight carboxylic acid reactant which is an ethylenically unsaturated mono- or polycarboxylic acid acylating agent containing a total of up to about twenty carbon atoms in the acyl moiety, the mole ratio of (A) to (B) being such that there is at least 0.5 mole of (B) for each mole of (A) with the proviso that (B) provides a minimum of one equivalent of carboxylic acid reactant in the reaction mixture per mole of (A); or II. at least one (C) ethylenically unsaturated aliphatic hydrocarbon or substituted aliphatic hydrocarbon reactant containing an average of at least about 50 aliphatic carbon atoms, at least one (D) low molecular weight monocarboxylic acid reactant which is an ethylenically unsaturated monocarboxylic acid acylating agent containing up to about 20 carbon atoms in the acyl moiety, and at least one (E) low molecular weight polycarboxylic acid reactant which is an ethylenically unsaturated polycarboxylic acid acylating agent containing up to about 20 carbon atoms in the acyl moiety, the mole ratio of (C): (D): (E) being such that there is at least about 0.5 mole of each of (D) and (E) per mole of (C) with the proviso that the combined amount of (D) and (E) provides a minimum of at least two equivalents of low molecular weight mono- and polycarboxylic acid reactants per mole of (C), the total amount of chlorine employed in said process being sufficient to provide at least about 0.8 mole of chlorine per mole of (B) or at least about 0.8 mole of chlorine per the total number of moles of (D) and (E), respectively.

2. A lubricant or fuel according to claim 1 wherein said reaction mixture is (I).

3. A lubricant or fuel composition according to claim 2 wherein (A) is at least one ethylenically unsaturated monocarboxylic acid acylating agent selected from the group consisting of the monocarboxylic acids per se, their corresponding anhydrides, acyl halides, esters derived from lower aliphatic monohydric alcohols of up to about seven carbon atoms selected from the lower alkanols, or mixtures of two or more of these ethylenically unsaturated monocarboxylic acylating agents, and wherein (B) is an $\alpha,\beta$-ethylenically unsaturated mono- or polycarboxylic acid acylating agent containing up to ten carbon atoms in the acyl moiety and selected from the group consisting of the carboxylic acids per se, their corresponding anhydrides, acyl halides, esters derived from lower aliphatic monohydric alcohols of up to about seven carbon atoms selected from the lower alkanols, and mixtures of two or more of these $\alpha,\beta$-ethylenically unsaturated mono- or polycarboxylic acid acylating agents.

4. A lubricant or fuel composition according to claim 3 wherein (A) is an aliphatic acylating agent having an average molecular weight within the range of about 700 to about 5,000 and being selected from the class consisting of the carboxylic acids per se, their anhydrides, their acyl chlorides, their lower alkyl esters derived from alkanols of up to four carbon atoms and mixtures of two or more of these, and wherein (B) is selected from the group consisting of aliphatic mono- or dicarboxylic acid acylating agents.

5. A lubricant or fuel composition according to claim 4 wherein (B) is selected from the group consisting of the carboxylic acids per se, their anhydrides, their acyl chlorides, their lower alkyl esters derived from alkanols of up to four carbon atoms, and mixtures of two or more of these.

6. A lubricant or fuel composition according to claim 5 wherein (B) is selected from the group consisting of acrylic acid, maleic acid, their anhydrides, their esters or mixtures of two or more of these.

7. A lubricant or fuel composition according to claim 1 wherein said reaction mixture is (II).

8. A lubricant or fuel composition according to claim 7 wherein (D) is at least one $\alpha,\beta$-ethylenically unsaturated monocarboxylic acid reactant containing up to ten aliphatic carbon atoms in the acyl moiety and selected from the group consisting of the monocarboxylic acids per se, their corresponding anhydrides, acyl halides, esters derived from lower aliphatic monohydric alcohols of up to about seven carbon atoms selected from the lower alkanols, and mixtures of two or more of these $\alpha,\beta$-ethylenically unsaturated monocarboxylic acid reactants, and wherein (B) is at least one $\alpha,\beta$-ethylenically unsaturated polycarboxylic acid reactant containing up to ten carbon atoms in the acyl moiety and selected from the group consisting of the polycarboxylic acids per se, their corresponding anhydrides, acyl halides, esters derived from lower aliphatic monohydric alcohols of up to about seven carbon atoms selected from the lower alkanols, and mixtures of two or more of these $\alpha,\beta$-ethylenically unsaturated polycarboxylic acid reactants.

9. A lubricant or fuel composition according to claim 8 wherein (C) has an average molecular weight of about 700 to about 100,000.

10. A lubricant or fuel composition according to claim 9 wherein (E) is a dicarboxylic acid reactant and wherein (D) and (E) are each selected from the carboxylic acids per se, their anhydrides, their acyl chlorides, their lower alkyl esters derived from the alkanols of up to four carbon atoms, and mixtures of two or more of these.

11. A lubricant or fuel composition according to claim 10 wherein (C) is a 1-monoolefin polymer having an average molecular weight of about 700 to about 5,000; (D) is selected from the group consisting of acrylic acid, its lower alkyl esters, and mixtures of two or more of these; and wherein (E) is selected from the group consisting of maleic acid, its anhydride, the lower alkyl esters thereof, and mixtures of two or more of these.

12. A lubricant or fuel composition comprising, respectively, a major amount of a lubricating oil or a normally liquid fuel and 0.0001% to about 20% by weight of at least one oil-soluble derivative selected from the class consisting of esters, acylated nitrogen compounds, and metal salts of oil-soluble high molecular weight carboxylic acid acylating agents as described in claim 1 and a member selected from the group consisting of monohydric aliphatic and cycloaliphatic alcohols of up to about twenty carbon atoms; polyhydric alcohols having from 2 to 10 hydroxyl groups and up to 20 carbon atoms; hydroxyaromatic compounds selected from the group consisting of phenols and naphthols and hydroxybenzene compounds having 2 to 4 hydroxyl groups; primary and secondary amines characterized by a radical having the configuration $$-\underset{|}{N}-H$$

where the two remaining valences of the nitrogen atom of the

radical are satisfied by hydrogen, amino, substituted amino, or an organic radical bonded to said nitrogen atom through direct carbon-to-nitrogen linkages; basically reacting metal compounds selected from the groups consisting of zinc, alkali and alkaline earth metal lower alkoxides, oxides, hydroxides, carbonates, sulfides, hydrosulfides and amides; and mixtures of two or more of these.

13. A lubricant or fuel composition comprising, respectively, a major amount of a lubricating oil or a normally liquid fuel and about 0.001% to about 20% by weight of at least one oil-soluble derivative selected from the class consisting of esters and acylated nitrogen compounds made from the oil-soluble high molecular weight carboxylic acid acylating agents as described in claim 5 and a member selected from the group consisting of polyhydric alkanols containing three to ten carbon atoms and having at least 3 hydroxy groups or alkylene polyamines or mixtures of two or more of these alkanols and polyamines.

14. A lubricant or fuel composition comprising, respectively, a major amount of a lubricating oil or a normally liquid fuel and about 0.001% to about 20% by weight of at least one oil-soluble derivative selected from the class consisting of esters and acylated nitrogen compounds made from the oil-soluble high molecular weight carboxylic acid acylating agents according to claim 8 and a member selected from the group consisting of polyhydric alkanols having three to ten carbon atoms and having at least 3 hydroxyl groups or alkylene polyamines and mixtures of two or more of these alkanols and polyamines.

15. A lubricant composition according to claim 1 wherein said lubricating oil is a mineral lubricating oil.

16. A lubricant composition according to claim 12 wherein said lubricating oil is a mineral lubricating oil.

17. A fuel composition according to claim 1 wherein said fuel is a petroleum distillate fuel.

18. A fuel composition according to claim 12 wherein said fuel is a petroleum distillate fuel.

19. A concentrate suitable for preparing a lubricant or fuel composition according to claim 1 comprising a substantially stable dispersion or solution of said at least one oil-soluble high molecular weight carboxylic acid acylating agent in a substantially inert nonpolar organic liquid, the amount of said at least one high molecular weight carboxylic acid acylating agent being such as to comprise from about 5% to about 90% by weight of said concentrate.

20. A fuel composition according to claim 12 wherein said fuel is a petroleum distillate fuel.

* * * * *